US009526209B2

(12) United States Patent
Honey

(10) Patent No.: US 9,526,209 B2
(45) Date of Patent: Dec. 27, 2016

(54) REEL SYSTEM WITH SUN AND PLANETARY GEAR DRIVE

(71) Applicant: HONEY BEE MANUFACTURING LTD., Frontier (SK)

(72) Inventor: Glenn Honey, Bracken (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 0 days.

(21) Appl. No.: 14/814,860

(22) Filed: Jul. 31, 2015

(65) Prior Publication Data

US 2016/0183465 A1    Jun. 30, 2016

(30) Foreign Application Priority Data

Dec. 24, 2014    (CA) ..................................... 2876686

(51) Int. Cl.
| | | |
|---|---|---|
| *A01D 57/03* | (2006.01) | |
| *A01D 57/12* | (2006.01) | |
| *A01D 45/00* | (2006.01) | |
| *A01D 61/00* | (2006.01) | |
| *A01D 57/02* | (2006.01) | |

(52) U.S. Cl.
CPC .............. *A01D 57/12* (2013.01); *A01D 45/00* (2013.01); *A01D 57/02* (2013.01); *A01D 57/03* (2013.01); *A01D 61/002* (2013.01)

(58) Field of Classification Search
CPC combination set(s) only.
See application file for complete search history.

(56) References Cited

U.S. PATENT DOCUMENTS

| | | | |
|---|---|---|---|
| 2,115,385 A | | 4/1938 | Edgington |
| 2,413,072 A | | 12/1946 | Sage |
| 2,694,894 A | | 11/1954 | Linscheld |
| 2,810,253 A | * | 10/1957 | Moore ................... A01D 78/02 56/372 |
| 3,468,109 A | | 9/1969 | Reimer |
| 3,472,008 A | | 10/1969 | Hurlburt |
| 3,550,366 A | | 12/1970 | Gibson |

(Continued)

FOREIGN PATENT DOCUMENTS

| | | |
|---|---|---|
| CA | 1003310 | 1/1977 |
| CA | 1040438 | 10/1978 |

(Continued)

OTHER PUBLICATIONS

"Cam", The Oxford English Dictionary (online: http://www.oed.com). Retrieved: at least as early as Mar. 3, 2015.

(Continued)

*Primary Examiner* — Alicia Torres

(57) ABSTRACT

A crop harvesting header includes a reel rotatable about a reel axis. The reel has a reel bat supported at a spaced distance from the reel axis. The reel bat can pivot about a bat axis radially spaced from the reel axis. The reel bat has a crop collection member that extends generally away from the bat axis. The reel bat can move in a cyclical path around the reel axis during rotation of the reel. The reel bat can vary the angle of the crop collection member about the bat axis as the reel rotates about the reel axis. A sun gear is provided that may be positioned in axial alignment with the reel axis. A planetary gear system is rotatable about the sun gear. The planetary gear system interacts with the sun gear, and causes said planetary gear system to effect pivotal movement of the reel bat about its bat axis.

26 Claims, 24 Drawing Sheets

(56) References Cited

U.S. PATENT DOCUMENTS

| | | | |
|---|---|---|---|
| 3,705,483 A * | 12/1972 | Jarrell | A01D 57/04 56/126 |
| 3,771,299 A | 11/1973 | Gradwohl et al. | |
| 3,927,512 A | 12/1975 | Molzahn | |
| 3,945,180 A | 3/1976 | Sinclair | |
| 4,038,810 A | 8/1977 | Williams et al. | |
| 4,067,177 A | 1/1978 | Tout | |
| 4,120,137 A | 10/1978 | Schoeneberger et al. | |
| 4,127,981 A | 12/1978 | Parrish et al. | |
| 4,137,696 A | 2/1979 | Webb | |
| 4,156,340 A | 5/1979 | Colgan et al. | |
| 4,174,602 A | 11/1979 | Webb et al. | |
| 4,177,625 A | 12/1979 | Knight et al. | |
| 4,187,664 A | 2/1980 | Meek et al. | |
| 4,202,154 A | 5/1980 | Waldrop et al. | |
| 4,270,338 A | 6/1981 | Halls | |
| 4,346,909 A | 8/1982 | Hundeby | |
| 4,353,201 A | 10/1982 | Pierce et al. | |
| 4,435,948 A | 3/1984 | Jennings | |
| 4,512,140 A | 4/1985 | Blakeslee | |
| 4,519,190 A | 5/1985 | Blakeslee | |
| 4,522,018 A | 6/1985 | Blakeslee | |
| 4,541,229 A | 9/1985 | Elijah | |
| 4,573,309 A | 3/1986 | Patterson | |
| 4,612,757 A | 9/1986 | Halls et al. | |
| 4,637,201 A | 1/1987 | Pruitt et al. | |
| 4,641,490 A | 2/1987 | Wynn et al. | |
| 4,660,361 A | 4/1987 | Remillard et al. | |
| 4,662,161 A | 5/1987 | Patterson | |
| 4,751,809 A | 6/1988 | Fox et al. | |
| 4,776,155 A | 10/1988 | Fox et al. | |
| 4,833,869 A | 5/1989 | Klein | |
| 4,909,026 A | 3/1990 | Molzahn et al. | |
| 4,936,082 A | 6/1990 | Majkrzak | |
| 4,956,966 A | 9/1990 | Patterson | |
| 5,005,343 A | 4/1991 | Patterson | |
| 5,007,235 A | 4/1991 | Nickel et al. | |
| 5,086,613 A | 2/1992 | Fox et al. | |
| 5,157,905 A | 10/1992 | Talbot et al. | |
| 5,243,810 A | 9/1993 | Fox et al. | |
| 5,261,290 A | 11/1993 | Ramsay et al. | |
| 5,359,839 A | 11/1994 | Parsons et al. | |
| 5,435,239 A | 7/1995 | Talbot | |
| 5,459,986 A | 10/1995 | Talbot et al. | |
| 5,473,872 A | 12/1995 | Fox et al. | |
| 5,595,053 A | 1/1997 | Jasper et al. | |
| RE35,543 E | 7/1997 | Patterson | |
| 5,678,398 A | 10/1997 | Fox et al. | |
| 5,681,117 A | 10/1997 | Wellman et al. | |
| 5,768,870 A | 6/1998 | Talbot et al. | |
| 5,791,128 A | 8/1998 | Rogalsky | |
| 5,927,606 A | 7/1999 | Patterson | |
| 5,992,759 A | 11/1999 | Patterson | |
| 6,029,429 A | 2/2000 | Fox et al. | |
| 6,044,636 A | 4/2000 | Minnaert | |
| 6,079,194 A | 6/2000 | Waldrop | |
| 6,170,244 B1 | 1/2001 | Coers et al. | |
| 6,195,972 B1 | 3/2001 | Talbot et al. | |
| 6,199,358 B1 | 3/2001 | Majkrzak | |
| 6,282,876 B1 | 9/2001 | Patterson | |
| 6,324,823 B1 | 12/2001 | Remillard | |
| 6,351,931 B1 | 3/2002 | Shearer | |
| 6,397,573 B2 | 6/2002 | Majkrzak | |
| 6,442,918 B1 | 9/2002 | Fox | |
| 6,453,655 B2 | 9/2002 | Ferraris | |
| 6,502,379 B1 | 1/2003 | Snider | |
| 6,519,923 B1 | 2/2003 | Cooksey et al. | |
| 6,530,202 B1 | 3/2003 | Guyer | |
| 6,543,211 B1 | 4/2003 | Talbot | |
| 6,591,598 B2 | 7/2003 | Remillard et al. | |
| 6,675,568 B2 | 1/2004 | Patterson et al. | |
| 6,698,175 B1 | 3/2004 | Schumacher et al. | |
| 6,708,475 B2 | 3/2004 | Guyer | |
| 6,817,166 B2 | 11/2004 | Dunn | |
| 6,843,045 B2 | 1/2005 | Bickel | |
| 6,854,251 B2 | 2/2005 | Snider | |
| 6,865,871 B2 | 3/2005 | Patterson et al. | |
| 6,962,040 B2 | 11/2005 | Talbot | |
| 7,077,220 B2 | 7/2006 | Dunn et al. | |
| 7,131,253 B2 | 11/2006 | Remillard et al. | |
| 7,159,687 B2 | 1/2007 | Dunn et al. | |
| 7,188,461 B2 | 3/2007 | Fox et al. | |
| 7,197,865 B1 | 4/2007 | Enns et al. | |
| 7,306,062 B2 | 12/2007 | Dunn | |
| 7,306,252 B2 | 12/2007 | Barnett | |
| 7,308,947 B2 | 12/2007 | Barnett | |
| 7,322,175 B2 | 1/2008 | Ferre et al. | |
| 7,328,565 B2 | 2/2008 | Snider et al. | |
| 7,340,876 B1 | 3/2008 | Barnett | |
| 7,347,277 B2 | 3/2008 | Enns et al. | |
| 7,356,982 B2 | 4/2008 | Barnett | |
| 7,364,181 B2 | 4/2008 | Patterson | |
| 7,373,769 B2 | 5/2008 | Talbot et al. | |
| 7,392,124 B2 | 6/2008 | MacGregor et al. | |
| 7,392,646 B2 | 7/2008 | Patterson | |
| 7,438,305 B2 | 10/2008 | Schulz | |
| 7,444,798 B2 | 11/2008 | Patterson et al. | |
| 7,454,888 B2 | 11/2008 | Barnett | |
| 7,461,498 B1 | 12/2008 | Barnett | |
| 7,467,505 B2 | 12/2008 | MacGregor | |
| 7,472,533 B2 | 1/2009 | Talbot et al. | |
| 7,484,349 B2 | 2/2009 | Talbot et al. | |
| 7,497,069 B2 | 3/2009 | Enns et al. | |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,849,952 B2 | 12/2010 | MacGregor et al. | |
| 7,856,801 B2 | 12/2010 | Remillard | |
| 7,918,076 B2 | 4/2011 | Talbot | |
| 7,958,706 B2 | 6/2011 | Remillard et al. | |
| 8,006,469 B2 | 8/2011 | Barnett | |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,069,640 B2 | 12/2011 | Barnett et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 | 10/2012 | Cormier et al. | |
| 8,307,620 B1 | 11/2012 | Barnett et al. | |
| 8,341,927 B2 | 1/2013 | Barnett | |
| 8,387,351 B2 | 3/2013 | Guyer | |
| 8,402,728 B2 | 3/2013 | Kidd | |
| 8,408,567 B2 | 4/2013 | Bergman et al. | |
| 8,434,290 B2 | 5/2013 | Barnett et al. | |
| 8,468,789 B2 | 6/2013 | Barnett et al. | |
| 8,484,938 B2 | 7/2013 | Cormier et al. | |
| 8,484,939 B1 | 7/2013 | Cormier et al. | |
| 8,511,050 B1 | 8/2013 | Cormier et al. | |
| 8,590,284 B2 | 11/2013 | Rayfield | |
| 2011/0088366 A1 * | 4/2011 | Graetz | A01D 78/04 56/366 |
| 2012/0251653 A1 | 10/2012 | Mathy, Jr. et al. | |
| 2012/0260870 A1 | 10/2012 | Wahl et al. | |
| 2013/0036860 A1 | 2/2013 | Corniani | |
| 2014/0001726 A1 | 1/2014 | Statz | |
| 2014/0033940 A1 | 2/2014 | Simpson et al. | |
| 2014/0150601 A1 | 6/2014 | McGrath | |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |

(56) References Cited

FOREIGN PATENT DOCUMENTS

| | | |
|---|---|---|
| CA | 1185438 | 4/1985 |
| CA | 1197694 | 12/1985 |
| CA | 2038150 A1 | 9/1991 |
| CA | 2120124 C | 4/1993 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2229122 C | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| WO | 2014/100105 A1 | 6/2014 |

OTHER PUBLICATIONS

"Track", The Oxford English Dictionary (online: http://www.oed.com). Retrieved: at least as early as Mar. 3, 2015.

"Cam", Canadian Oxford Dictionary (Toronto: Oxford University Press, 1998).

"Track", Canadian Oxford Dictionary (Toronto: Oxford University Press, 1998).

"Cam." Merriam-Webster.com (online: http://www.merriam-webster.com/dictionary/cam). Retrieved: at least as early as Mar. 3, 2015.

"Track." Merriam-Webster.com (online: http://www.merriam-webster.com/dictionary/track). Retrieved: at least as early as Mar. 3, 2015.

"Cam" Dictionary.com (online: http://www.dictionary.com). Retrieved: at least as early as Mar. 3, 2015.

"Track" Dictionary.com (online: http://www.dictionary.com). Retrieved: at least as early as Mar. 3, 2015.

"Cam [MECH ENG]". McGraw-Hill Dictionary of Scientific and Technical Terms, 6th ed (Toronto: McGraw-Hill, 2003).

"Track [ENG]". McGraw-Hill Dictionary of Scientific and Technical Terms, 6th ed (Toronto: McGraw-Hill, 2003).

Cam. Van Nostrand's Scientific Encyclopedia, 8th ed (Toronto: Van Nostrand, 1995), pp. 510-511.

Shabana, Ahmed A., Computational Dynamics, 3rd ed. (Wiley, 2009), pp. 5-6.

Norton, Robert L., Machine Design: An Integrated Approach, 2nd ed (Prentice Hall, 2000), Section 11, pp. 683-685.

Zhang, Yi, Chapter 6: Cams, Introduction to Mechanisms (Carnegie Mellon University online: https://www.cs.cmu.edu/~rapidproto/mechanisms/chpt6.html), Retrieved: at least as early as Jan. 23, 2015.

Zhang, Yi, Chapter 7: Gears, Introduction to Mechanisms (Carnegie Mellon University online: https://www.cs.cmu.edu/~rapidproto/mechanisms/chpt7.html), Retrieved: at least as early as Jan. 23, 2015.

(56) References Cited

OTHER PUBLICATIONS

"Cam", Wikipedia (online: https://en.wikipedia.org/w/index.php?title=Cam&oldid=643486126), Retrieved: at least as early as Jan. 23, 2015.
"Cam follower", Wikipedia (online: https://en.wikipedia.org/w/index.php?title=Cam_follower&oldid=633357791), Retrieved: at least as early as Jan. 23, 2015.
"Reciprocating Motion", Wikipedia (online: https://en.wikipedia.org/w/index.php?title=Reciprocating_motion&oldid=627796274), Retrieved: at least as early as Jan. 23, 2015.
"Gear", Wikipedia (online: https://en.wikipedia.org/w/index.php?title=Gear&oldid=643602868), Retrieved: at least as early as Jan. 23, 2015.
"Piston Motion Equations", Wikipedia (online: https://en.wikipedia.org/w/index.php?title=Piston_motion_equations&oldid=630186988), Retrieved: at least as early as Mar. 2, 2015.
International Search Report mailed on Feb. 25, 2016 by the Canadian Intellectual Property Office as the International Searching Authority in connection with International Patent Application No. PCT/CA2015/000601, 4 pages.
Witten Opinion of the International Searching Authority mailed on Feb. 25, 2016 by the Canadian Intellectual Property Office in connection with International Patent Application No. PCT/CA2015/000601, 6 pages.
Corrected Version of the International Search Report mailed on Mar. 16, 2016 by the Canadian Intellectual Property Office as the International Searching Authority in connection with International Patent Application No. PCT/CA2015/000601, 6 pages.
Corrected Version of the Written Opinion of the International Searching Authority mailed on Mar. 16, 2016 by the Canadian Intellectual Property Office in connection with International Patent Application No. PCT/CA2015/000601, 6 pages.

\* cited by examiner

REEL SYSTEM WITH SUN AND PLANETARY GEAR DRIVE

TECHNICAL FIELD

This relates to the field of agricultural machinery and equipment and in particular crop harvesting headers.

BACKGROUND

The use of crop harvesting headers is known in the field of agriculture. Headers are used for a variety of purposes, such as for example to harvest crops with a header on a combine harvester or to swath crop material with a header on a swather.

Harvesting equipment may be equipped with a header located generally at its front portion. The header may be generally oriented transverse to the direction of movement of the harvesting equipment during operation. The header may include a support frame, a cutting system (often referred to as a "cutter bar") to cut the portion of the crop that is to be harvested, a crop collection system having a surface or "table" onto which cut crop material can be collected and transported for further processing, and a rotating reel to collect and sweep crop material onto the collection table. A typical reel may include a main central reel tube that rotates about a reel axis and the central reel tube may be surrounded by and interconnected to a series of smaller tubes (often referred to as "bats"). Bats are typically oriented generally parallel to the main reel tube, and spaced radially apart from each other, typically with equal angular spacing about the reel axis. A plurality of structural arms (often referred as "spiders") may extend radially from the central reel tube to support the bats in a radial position relative to the central reel tube. Each bat may be equipped with a plurality of crop collection members (which may for example be "fingers" or "tines") and which may extend from the bats in a generally outward radial direction.

During operation of some typical headers known in the art, rotation of the main reel tube may cause the attached bats to rotate about both the central reel axis as well as about their own axis passing longitudinally along the length of the bats. Thus the fingers of the bats may also be configured to sweep standing crops towards the cutter bar as the header moves through a field, and may assist in collecting crops that have been cut by the cutter bar and moving them onto the collection surface of the crop collection system once the crop material has been cut. Fingers [tines] attached to the bats may assist in the gathering, sweeping, and collecting of crop material by creating a raking motion which may effectively engage standing crops on a field.

The performance of a header may be improved in several ways. Headers may be constructed for various requirements (such as type of crop or field conditions) by providing a means for adjusting the height or position of the reel. The motion and position of fingers [tines] may also be adjusted for improved crop engagement. For example, the angle of the fingers [tines] relative to the bats may be adjusted to optimize crop engagement. The motion of fingers [tines] may improve crop engagement, separate cut crop from uncut crop, and also facilitate release of crops from the reel onto the table.

One known mechanism for controlling the motion of bats and fingers [tines] is by a cam and cam follower system. Using a cam, bats and fingers [tines] may be guided during the rotation of the reel to follow a non-circular path. In such systems, the path of motion of bats and fingers [tines] may depend at least in part on the shape of the cam and cam follower mechanisms. However, there are disadvantages to cam-controlled bats. For example, cam-controlled bats may have increased wear and tear due to the friction between cams and cam followers. It may also be difficult to adjust cam systems because each cam design may only be optimized for a specific application, and adjustment of the reel for other requirements (such as crop type or field conditions) may require replacement of the cam system which may be quite time consuming and difficult to accomplish.

Accordingly, it may be desirable to utilize alternative ways for controlling the movement of bats and fingers [tines] on a header.

SUMMARY

According to one aspect of the invention there is provided a crop harvesting header comprising: a reel rotatable about a reel axis, the reel having at least one reel bat supported at a spaced distance from the reel axis, the at least one reel bat being operable for pivotal movement about a bat axis radially spaced from said reel axis and oriented generally parallel to the reel axis. The at least one reel bat has at least one crop collection member connected thereto, and the at least one crop collection member extends generally away from the bat axis. The at least one reel bat is operable to move in a cyclical path around the reel axis during rotation of the reel. The at least one reel bat is operable to be pivoted about its bat axis so as to vary the angle of the at least one crop collection member about the bat axis as the reel rotates about the reel axis. The header also comprises a sun gear that may be positioned in axial alignment with the reel axis; and a planetary gear apparatus being rotatable about and relative to the sun gear and rotatable about the reel axis. The planetary gear apparatus is operable during rotation about the reel axis with the reel to interact with the sun gear, and cause the planetary gear apparatus to effect pivotal movement of the at least one reel bat about its bat axis. Also is provided a piece of harvesting equipment comprising the header as just recited and a propulsion unit.

According to another aspect of the invention there is provided a kit for use with a harvesting header, the kit being configured to be interconnected to a reel of the harvesting header. The kit comprises: (a) a sun gear apparatus comprising a sun gear; and (b) a planetary gear assembly comprising (i) a plurality of planetary gear systems, each of said planetary gear systems positioned and operable to be rotated about the sun gear; (ii) at least one gear carrier plate operable to support the plurality of planetary gear systems; said planetary gear assembly being operable to be rotated about the sun gear; and (c) a connection mechanism for connecting the sun gear assembly to the planetary gear assembly. When the end kit is interconnected to a reel, in operation the reel is rotated about a reel axis, and each of the plurality of planetary gear systems is operable to cause pivotal movement of one of a plurality of reel bats to pivot about its respective bat axis.

According to another aspect of the invention there is provided method of operating a crop harvesting header comprising: providing a reel rotatable about a reel axis, the reel having at least one reel bat supported at a spaced distance from the reel axis, the at least one reel bat being operable for pivotal movement about a bat axis located radially outward from the reel axis and oriented generally parallel to the reel axis; the at least one reel bat having at least one crop collection member connected thereto, said at least one crop collection member extending generally away from the bat axis, the at least one reel bat being operable to move in a cyclical path around the reel axis during rotation of the reel; the at least one reel bat being operable to be pivoted about its bat axis so as to vary the angle of the at least one crop collection member about the bat axis as the reel rotates about the reel axis; providing a sun gear in axial alignment with the reel axis; providing a planetary gear system being rotatable about and relative to said sun gear and about said reel axis; rotating said reel about said reel axis; rotating said planetary gear system about the reel axis in interaction with the sun gear to cause said planetary gear system to effect pivotal movement of said at least one reel bat about its bat axis.

According to another aspect of the invention there is provided a joint device for transmitting torque between a first shaft and a second shaft. The joint device comprises: a housing connected to an end portion of a first shaft, the housing having an interior cavity configured to permit an end portion of a second shaft to be received therein; the housing having an opening configured to allow the second shaft to extend from the end portion of said second shaft through the opening; at least one block located in the interior cavity of the housing, the at least one block having at least one inner surface and at least one outer surface, the at least one block being located between at least one inner surface of the housing and at least one outer surface of said end portion of the second shaft; the at least one inner surface of the at least one block being operable to engage the at least one surface of the end portion of the second shaft; the at least one outer surface of the block being operable to engage the at least one inner surface of the housing; the at least inner wall of the housing, the at least one outer face of the at least one block, the at least one inner face of the at least one block and the at least one outer surface of the end portion of the second shaft being configured to functionally co-operate such that in operation, rotation of the first shaft will cause said joint device to rotate to thereby effect rotation of the second shaft.

According to another aspect of the invention there is provided a crop harvesting header comprising: a reel supported for rotation about a reel axis, the reel having at least one reel bat supported at a spaced distance from the reel axis, the at least one reel bat being operable for pivotal movement about a bat axis spaced from the reel axis and oriented generally parallel to the reel axis; the at least one reel bat having at least one crop collection member connected thereto, the at least one crop collection member extending generally away from the bat axis, the at least one reel bat being operable to rotate around the reel axis during rotation of the reel; the at least one reel bat being operable to be pivoted about its bat axis so as to vary the angle of the at least one crop collection member about the bat axis as the reel rotates about the reel axis. The header also comprises (i) a sun gear that may be supported in axial alignment with the reel axis; (ii) a planetary gear system being supported and rotatable about and relative to the sun gear. The planetary gear system is operable during rotation about the reel axis to interact with the sun gear, and cause the planetary gear system to effect pivotal movement of the at least one reel bat about its bat axis.

According to another aspect of the invention there is provided a crop harvesting header comprising: a reel rotatable about a reel axis, the reel having at least one reel bat supported at a spaced distance from the reel axis, the at least one reel bat being operable for pivotal movement about a bat axis radially spaced from said reel axis and oriented generally parallel to the reel axis; the at least one reel bat having at least one crop collection member connected thereto, the at least one crop collection member extending generally away from the bat axis, the at least one reel bat having an outward end. The at least one reel bat is operable to move in a cyclical path around the reel axis during rotation of the reel. The at least one reel bat is operable to be pivoted about its bat axis so as to vary the angle of the at least one crop collection member about the bat axis as the reel rotates about the reel axis. The header may further include a reel end kit comprising (i) a gear system and (ii) a bat connection mechanism connecting the gear system to the at least one reel bat. The gear system is operable during rotation to interact with the sun gear, and to effect pivotal movement of the at least one reel bat about its bat axis.

According to another aspect of the invention there is provided a method of providing an end kit for a reel for a crop harvesting header, said method comprising: (a) constructing an end kit comprising: (i) an axle; (ii) a gear system and a bat connection mechanism operable for connecting said gear system to at least one reel bat of said reel (b) installing said end kit on a reel.

According to another aspect of the invention there is provided a method of constructing an end kit for a reel for a crop harvesting header, the end kit comprising: (i) an axle; (ii) a gear system and a bat connection mechanism operable for connecting the gear system to at least one reel bat of the reel and (iii) at least one gear carrier plate. The method comprises (i) providing the axle; (ii) installing the at least one gear carrier plate on the axle; (iii) installing the gear system and the bat connection mechanism on the at least one gear carrier plate.

BRIEF DESCRIPTION OF THE DRAWINGS

In the figures which illustrate by way of example only embodiments.

DETAILED DESCRIPTION

Figure 1:
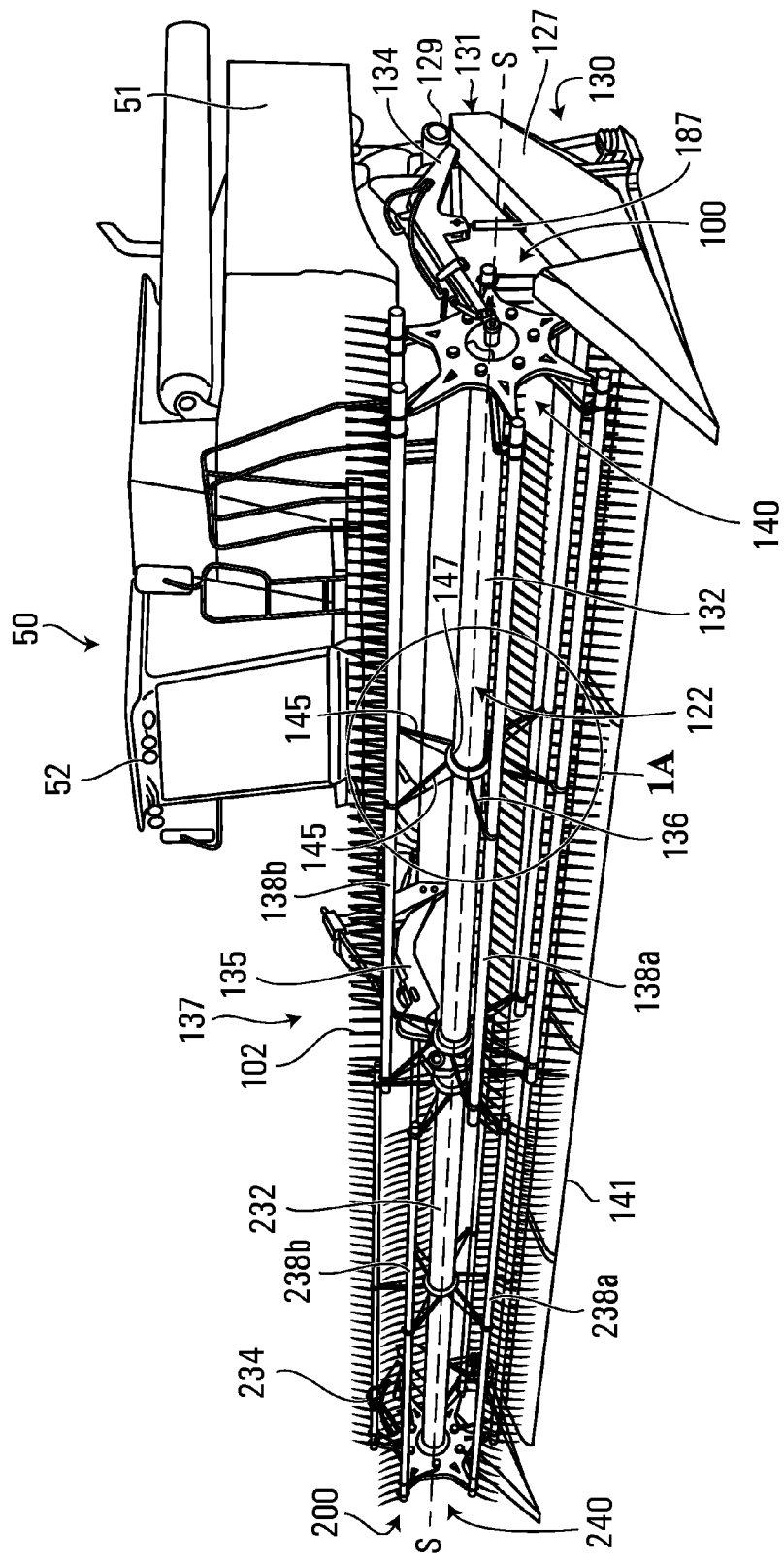
FIG. 1 is a perspective view of a combine harvester with a header attached.

With reference initially to FIG. 1, a piece of agricultural harvesting equipment generally designated 50, in particular a combine harvester, is shown schematically. Combine harvester 50 may include a propulsion and processing portion 51 (hereinafter referred to as a "propulsion unit" 51) and a header 130. Propulsion unit 51 may include an operator cab 52 from which the operation of the combine harvester 50 and its components may be controlled.

Header 130 may be generally oriented transversely to the direction of movement of the combine harvester 50 when the combine harvester is moving in a field to cut crops growing on the ground. Header 130 may include a support frame generally designated 131 that may include a longitudinally and transversely extending main frame tube or beam portion 129 extending between side frame members 127. Main frame tube 129, and interconnected side frame members 127 that may extend forward from main frame tube 129, may be interconnected to and supported on a propulsion unit 51 of combine harvester 50. Propulsion unit 51 may be of a known type such as a combine harvester model S690 made by John Deere. In some embodiments, support frame 131 may be translatable and rotatable in various directions relative to the propulsion unit 51 of the combine harvester 50.

Figure 2:
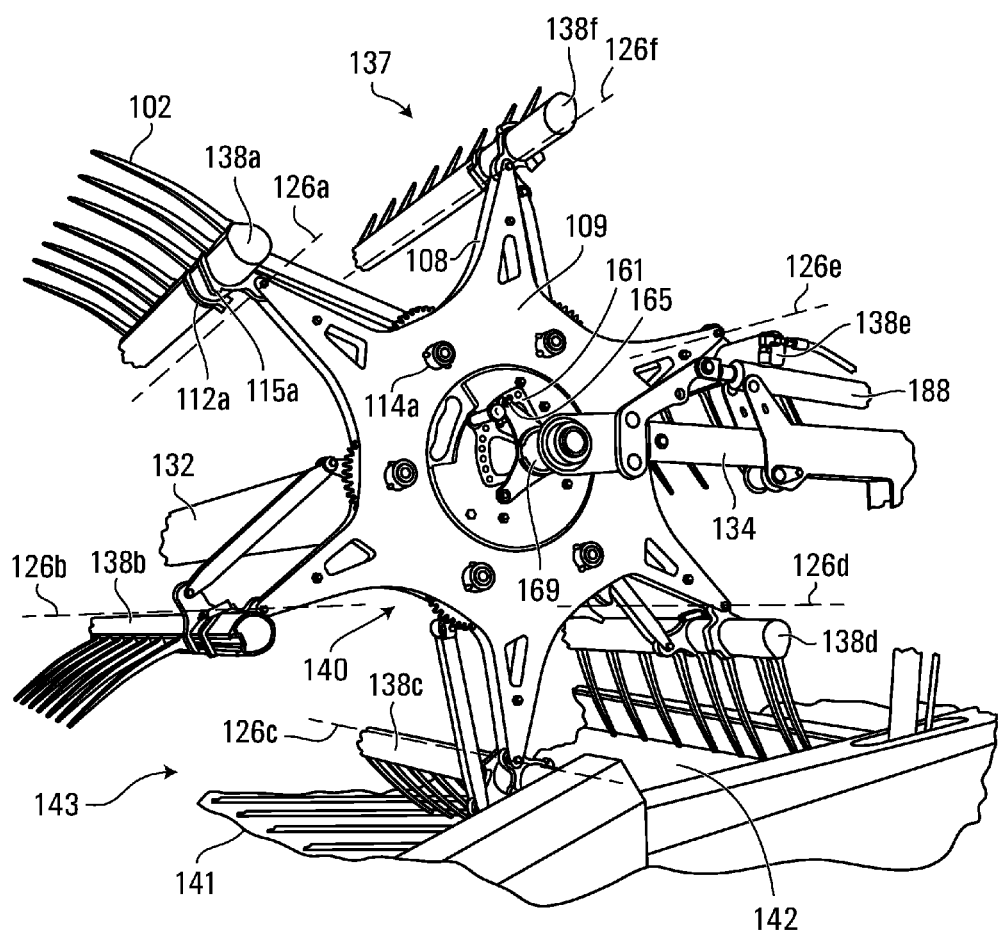
FIG. 2 is an end perspective view of a reel, showing a reel end kit in relation to a main reel tube, reel bats, fingers [tines], and part of a cutting system of the combine harvester of FIG. 1.
Figure 2A:
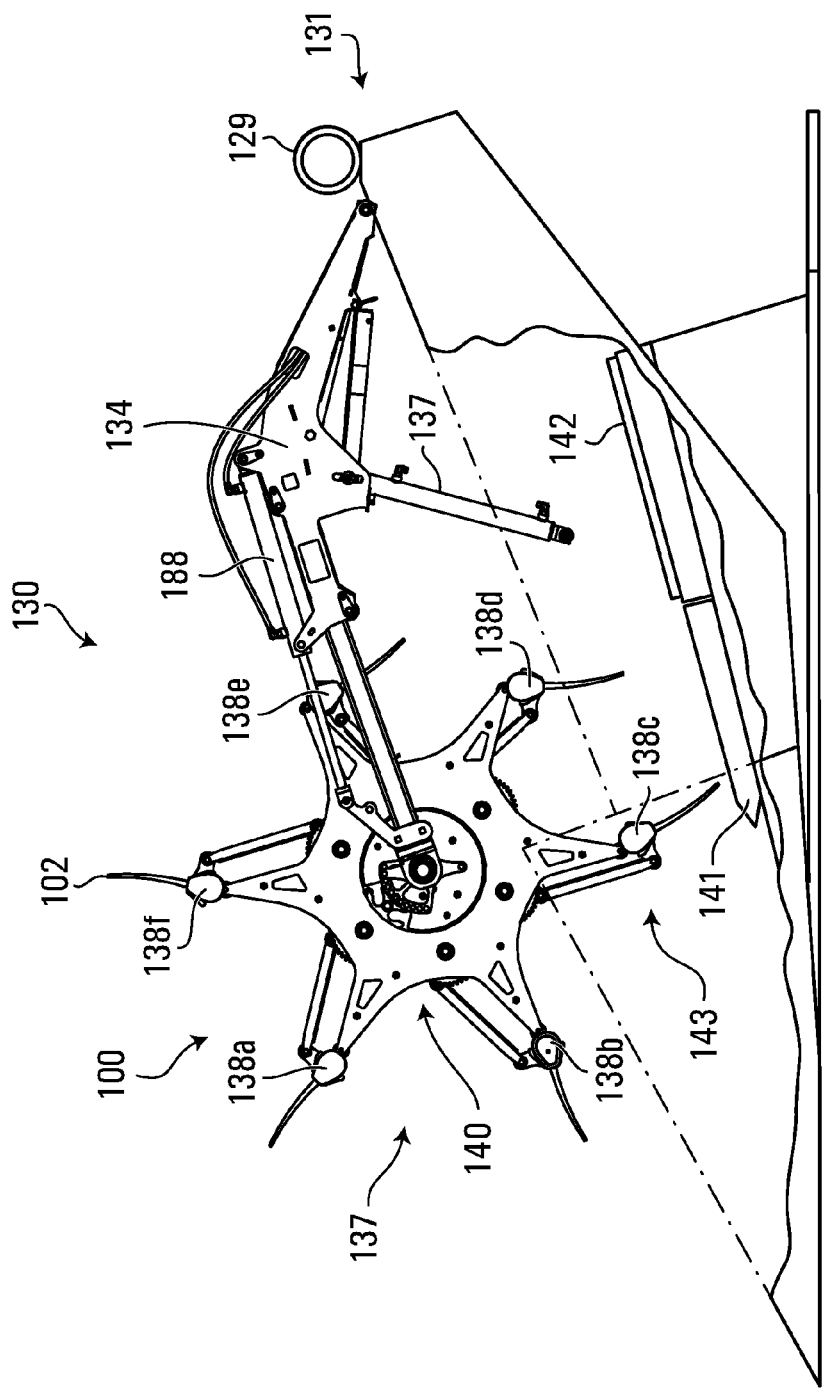
FIG. 2A is a side elevation view of the header from the combine harvester of FIG. 1, with the header frame partially cut-out.

Referring now to FIGS. 2 and 2A, header 130 may also include a cutting system (often referred to as a "cutter bar") 141 that may be operable to cut crop material growing on the ground that is to be harvested. Header 130 may also include a crop collection system 143 that may have a surface or "table" 142 onto which cut crop material can be moved and collected. Crop collection system 143 may also include a conveyor (sometimes known as a "draper") associated with table 142 that can transport cut crop material transversely for further processing. In other embodiments, crop collection system 143 may include an auger type conveyor adapted to transport crop material for processing. In a typical combine harvester 50 such as shown in FIG. 1, there may be two conveyors located on either side of a common discharge location and the conveyors may both transport cut crop material transversely and inwardly to the common discharge location (often known as a "lateral draper") where the crop material may be discharged from the header 130 and may in the case of a combine harvester like combiner harvester 50 be fed to the propulsion unit 51 of the combine harvester 50 for further processing. In other types of agricultural harvesting equipment, crop material may be discharged at the discharge location onto the ground where it may be further handled and/or processed with additional agricultural machinery. Both the construction and operation of the support frame 131, cutting system 141 and crop collection system 143 may be of types that are well known in the industry.

Figure 6:
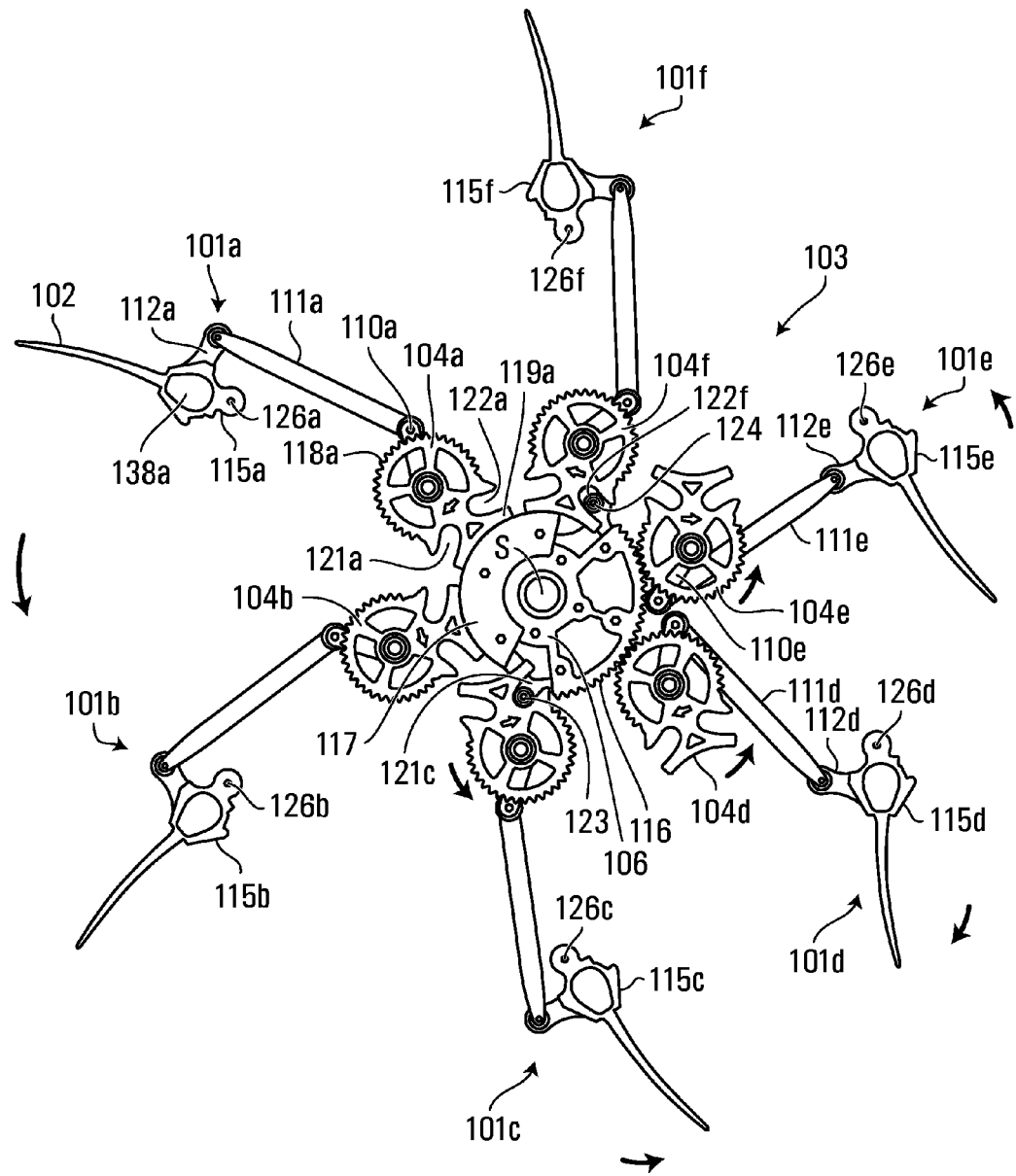
FIG. 6 is a schematic side elevation view of the reel end kit of FIG. 5 with gear carrier plates omitted for clarity.

Header 130 may also include a reel generally designated 137 (FIG. 1) which may be operable to rotate to push crop towards the cutter bar 141 and collect and sweep cut crop material onto collection table 142 (FIG. 2A). Reel 137 may include a central main reel tube 132 that rotates about a central reel axis (which in FIG. 1 is also coincident with sun axis S as will be explained hereinafter). In some embodiments, main reel tube 132 may span substantially the entire width of the header 130. In other embodiments such as the illustrated embodiment as shown in FIG. 1, two or more separate main reel tubes 132, 232 may be provided with the two or more main reel tubes being positioned in longitudinal alignment with each other such that in combination they span substantially the entire width of the header. Each of the separate main reel tubes 132, 232 may be oriented along a common reel axis and may be oriented co-axially coincident with sun axis S which is the axis through the center of sun gear 106 (FIG. 6). Main reel tube 232 may be constructed substantially identically to main reel tube 132 as described herein. It should be noted that while in the illustrated embodiment, the reel axis and sun axis S are coincident, in other embodiments a planetary gear apparatus comprising a planetary gear assembly and a sun gear assembly may be constructed in which a sun axis S through the centroid of a sun gear is not coincident with the reel axis.

Main reel tube 132 may be surrounded by, and be interconnected to, a plurality of elongated members (referred to herein as "bats" or "reel bats") 138a-f that like main reel tube 132 may extend transversely and may be oriented with a longitudinal axis that is generally parallel to the main reel tube 132 and the reel axis/sun axis S. Bats 138a-f may be formed as elongated hollow tubular members and may be spaced radially outward from sun axis S and main reel tube 132 and be angularly spaced apart from each other, sometimes with equal angular spacing about sun axis S. It may be appreciated that while reel 137 as described herein has six bats 138a-138f, the number of bats for any particular reel 137 may be varied according to the requirements of any particular application.

Main reel tubes 132, 232 may be formed as a cylindrical generally hollow tube from of any suitable material(s) such as for example round steel tubing. Similarly, bats 138a-138f may also be formed from any suitable material(s) such as for example extruded aluminum profile.

Figure 1A:
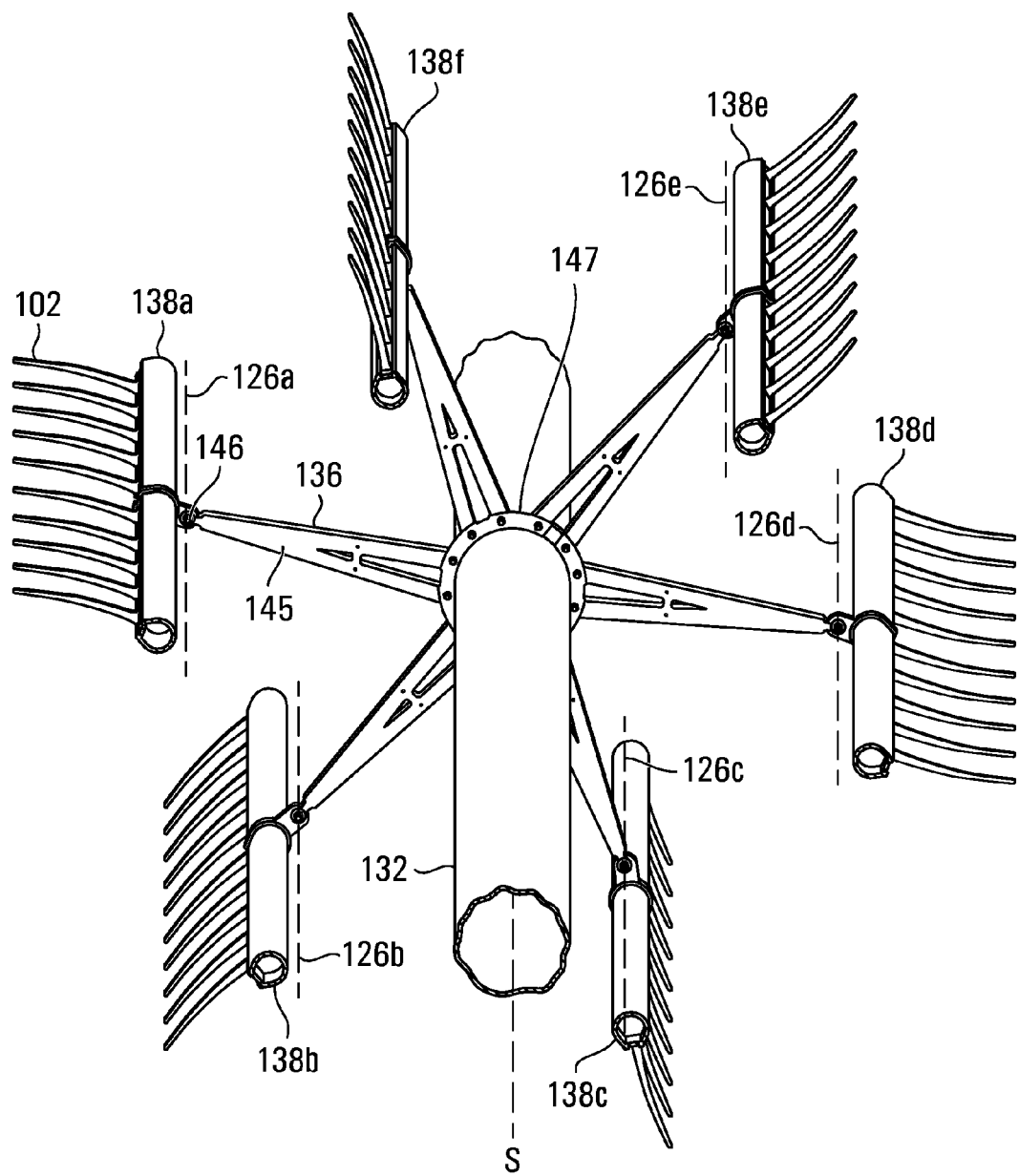
FIG. 1A is an enlarged perspective view of the portion of the reel marked 1A as shown in FIG. 1.

One or more support elements 136 (often referred to as "spiders") may also be connected to and positioned along, in spaced relation to each other, the main reel tube 132. Referring now to FIG. 1A, each spider 136 may have arms 145 that extend radially outward from an annular spider collar 147 that is fixedly attached in a conventional manner such as by welding or bolts to main reel tube 132. Spiders 136 may be made from any suitable material(s) such as steel or aluminum. Spider arms 145 may extend and may be interconnected to the bats 138a-f to support the bats 138a-f in radial positions relative to the central main reel tube 132. The bats 138a-f may be connected to the distal ends of the arms 145 of spiders 136 with a pivot link 146 that will allow each of the bats to pivot about the end of the spider arm in an arc about respective bat pivot axes 126a-126f.

Each bat 138a-f may be equipped with a plurality of crop collection members (such as fingers or tines) 102 that may be mounted in spaced relation along each bat 138a-f and which may extend from each of the bats in a generally outward direction from its respective bat. Crop collection members 102 may be made from any suitable material(s) such as plastic and/or other composites, and may also be made from steel or similar metals.

During operation, as will be explained in further detail hereinafter, the rotation of the main reel tube 132 causes each of the interconnected bats 138a-f to rotate in a complex path including rotation about the reel axis/sun axis S as well as pivot about longitudinal bat pivot axes 126a-126f through the action of pivot links 146 at the end of the arms 145 of the spiders 136. Rotation of planetary members about an axis of a planetary member (described in detail hereinafter) causes a linkage mechanism inter-connected to each bat to move and thus driving the pivoting movement of each bat 138a-138f about its respective bat axis 126a-126f.

Bat pivot axes 126a-126f may be oriented longitudinally, generally parallel to the length of the respective bat 138a-138f, and may be parallel to each other and parallel to the reel axis/sun axis S. Thus the fingers [tines] 102 of each of the bats 138a-f may be configured and oriented during a complex combined rotational movement, to sweep standing crops towards the cutter bar 141 as the combine harvester 50 with header 130 mounted thereto, moves through a crop field, and may assist in collecting crops that have been cut by the cutter bar 141 and moving them onto the collection deck 142 of the header 130 once the crop material has been cut.

In the embodiment of FIGS. 1 and 2, two sets of bats may be provided. First set of bats 138a-f may be mounted to main reel tube 132 and a second set of bats 238a-f may be mounted to a second main reel tube 232 in an axially aligned, substantially end-to-end relationship to the first set of bats 138a-f but with at least a small amount of longitudinal spacing between the two sets of bats to allow the reel drive arm 135 and reel drive assembly 170 (FIG. 10) to be located there between. Bats 138a-f may in some embodiments, such as the embodiment shown in FIGS. 1 and 2, be mounted angularly about central reel tube 132 and sun axis S in an out of angular phase relationship to bats 238a-f.

Also as shown in FIGS. 1 and 2, header frame 131 may include reel arms 134, 234 each at opposed ends of the header 130 and a medial reel drive arm 135 and reel drive assembly 170 (FIG. 10), located substantially at the middle of the header in a transverse direction. Reel arm 134 and reel drive arm 135 together may rotatably support main reel tube 132, while reel arm 234 and reel drive arm 135 together may rotatably support main reel tube 232. Reel arms 134, 135 may be made from any suitable material(s) such as steel. As main reel tube 232 is substantially identical to main reel tube 132, only main reel tube 132 will be described in detail hereinafter. In an alternate embodiment, a single reel may be used with header 130, with main reel tube 132 supported on one end by a reel drive arm and on the other end by a reel arm.

Main reel tube 132 may comprise a generally cylindrical outer housing that may be interconnected to reel axle 150. Referring to FIGS. 3, 3A, 4, and 4A, reel axle 150 may be a cylindrical rod made of a durable material such as by way of example only steel. Reel axle 150 may be fixedly attached on one interior end to an end plate 151 (FIGS. 3A and 4A) that may be made of a similar material, by means such as welding. End plate 151 may be generally star-shaped. With particular reference to FIG. 4A, at a longitudinal distance outward along reel axle 150 and away from end plate 151, a collar 154 may be fixedly attached to reel axle 150 by any suitable means such as welding. A connection plate 152 that may also be made of a similar material to rear axle 150 may be fixedly attached to reel axle 150 at the position of collar 154 by means such as welding. Connection plate 152 may have a generally circular aperture centrally positioned to allow reel axle 150 to pass through, and may be generally star shaped with bolt holes proximate an end of each arm of the star shaped plate 152. Bolts may then be provided to pass through the bolt holes in each arm of connection plate 152 and extend into aligned corresponding bolt holes of an inner gear carrier plate 108, thus securing plate 152 to inner gear carrier plate 108. In other embodiments, end plate 151 and connection plate 152 may be disc-shaped or other non-circular shapes. Reel axle 150 may extend a short distance into, and end plate 151 may be positioned a short distance within, the outward end portion of main reel tube 132. End plate 151 may be sized to fit closely with, and preferably engage with, the interior surface of the housing of main reel tube 132 that generally defines the interior cavity of main reel tube 132, thereby keeping reel axle 150 and main reel tube 132 aligned generally coaxially. A plurality of cleats or brackets 153a, 153b, 153c may be positioned at or proximate the outward end of main reel tube 132 and may be fixedly attached to main reel tube 132 by known types of attachment means such as welding on to the exterior surface of the housing of main reel tube 132. Cleats/brackets 153a, 153b, and 153c may be made of a suitable material(s) such as steel, and may be provided with one or a plurality of bolt holes. Cleats 153a, 153b, and 153c may be attached to a planetary gear end kit 140 (described below) by means of bolts through bolt holes provided on each cleat and corresponding bolt holes on inner gear carrier plate 108.

When main reel tube 132 is driven around the reel axis (and sun axis S) by a reel drive mechanism (as will be described below), a rotational force may be transmitted through cleats/brackets 153a, 153b, 153c onto inner gear plate 108 which can cause the inner gear plate 108 and those components fixedly attached to inner gear plate 108 to rotate about the reel axis/sun axis S.

Figure 3:
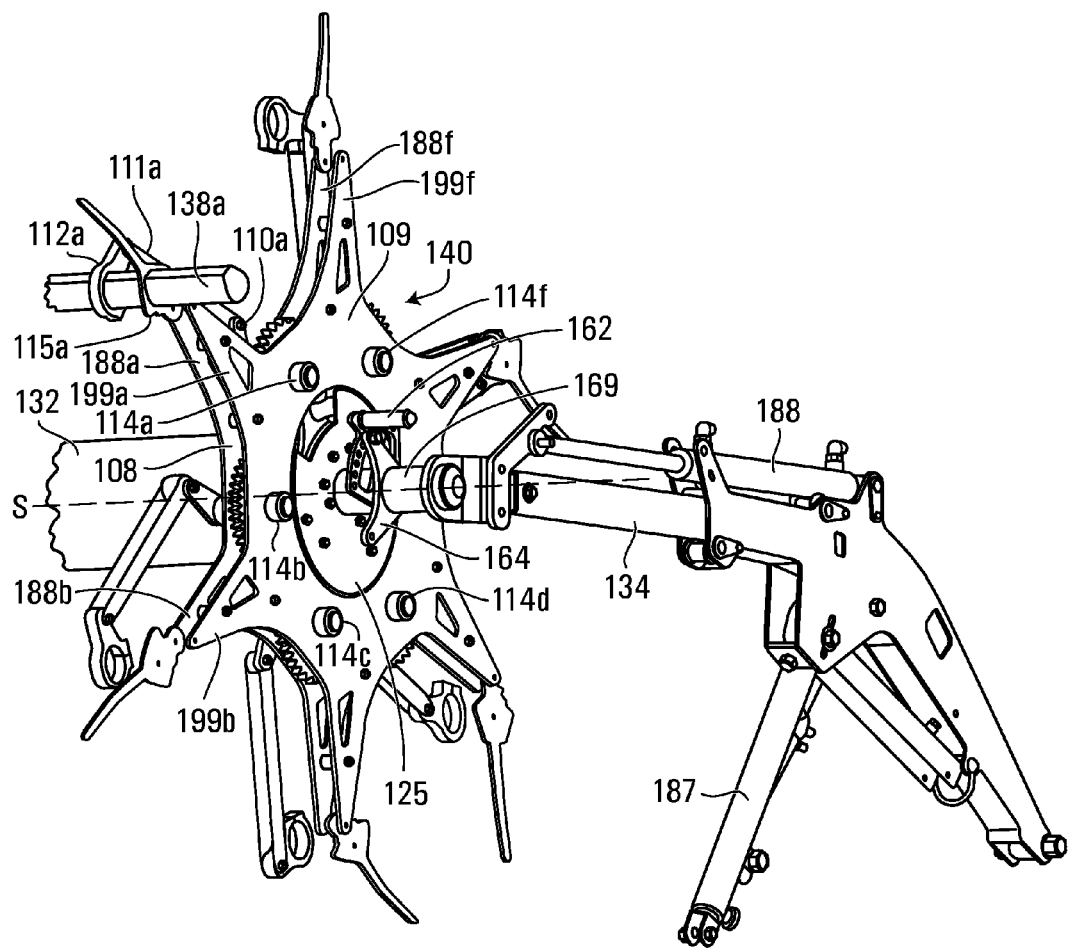
FIG. 3 is a perspective view of the reel end kit of FIG. 2.
Figure 3A:
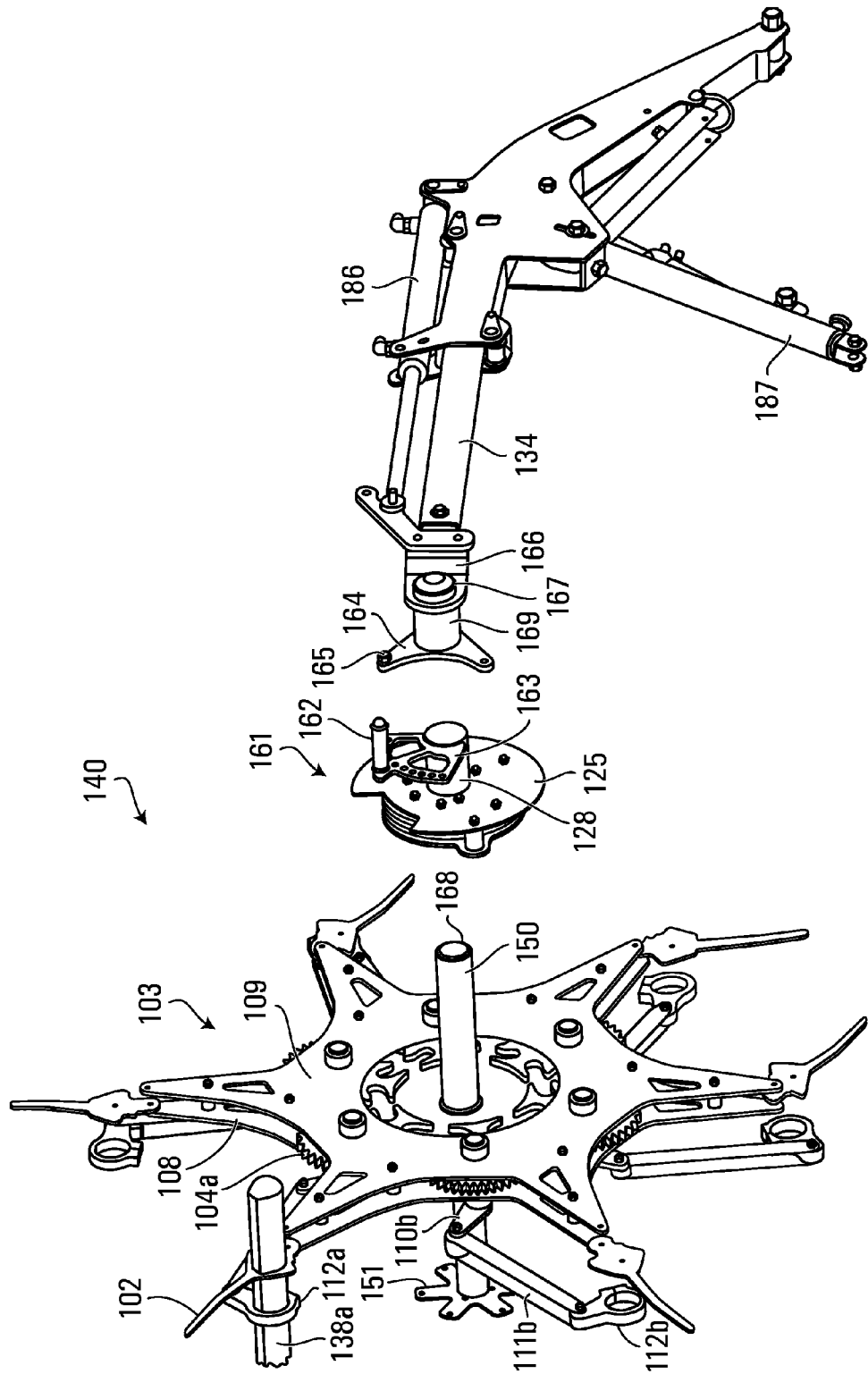
FIG. 3A is an exploded perspective view of the reel end kit of FIG. 3.

With particular reference now to FIGS. 3 and 3A, a gear end kit is illustrated which may be a planetary gear end kit 140. In other embodiments, gear apparatuses other than planetary gear apparatuses may form part of a gear end kit used with reel 137. However, a planetary gear kit like kit 140 is of particular benefit. Planetary gear end kit 140 may include reel axle 150 that may be rotatably supported by reel arm 134. Planetary gear end kit 140 may also include a planetary gear apparatus that may include gear carrier plates 108, 109, planetary gear assembly 103. Planetary gear assembly 103 may at least in part be sandwiched between gear carrier plates 108, 109 such that at least some of the components (in particular the planetary gears 104a-104f) may be significantly protected by being sandwiched between the gear carrier plates 108, 109. Planetary gear end kit 140 may also include a sun gear assembly 161 supported on reel axle 150 (as described below). Reel axle 150 may be mounted to reel mounting sleeve 169 (FIGS. 3A and 4) and may be configured to be rotatable within reel mounting sleeve 169 by means such as a bushing/bearings 139 (not shown). Reel axle 150 may be held in place within reel mounting sleeve 169 by a snap ring 167, which is designed to snap onto a ridge or neck 168 at the end of reel axle 150. Reel mounting sleeve 169 may be a hollow cylindrical tube, and may be fixedly attached to reel mount plate 166 by means such as welding. Reel mount plate 166 may be fixedly attached to reel arm 134 and may be fixedly attached by means such as bolts.

Figure 10:
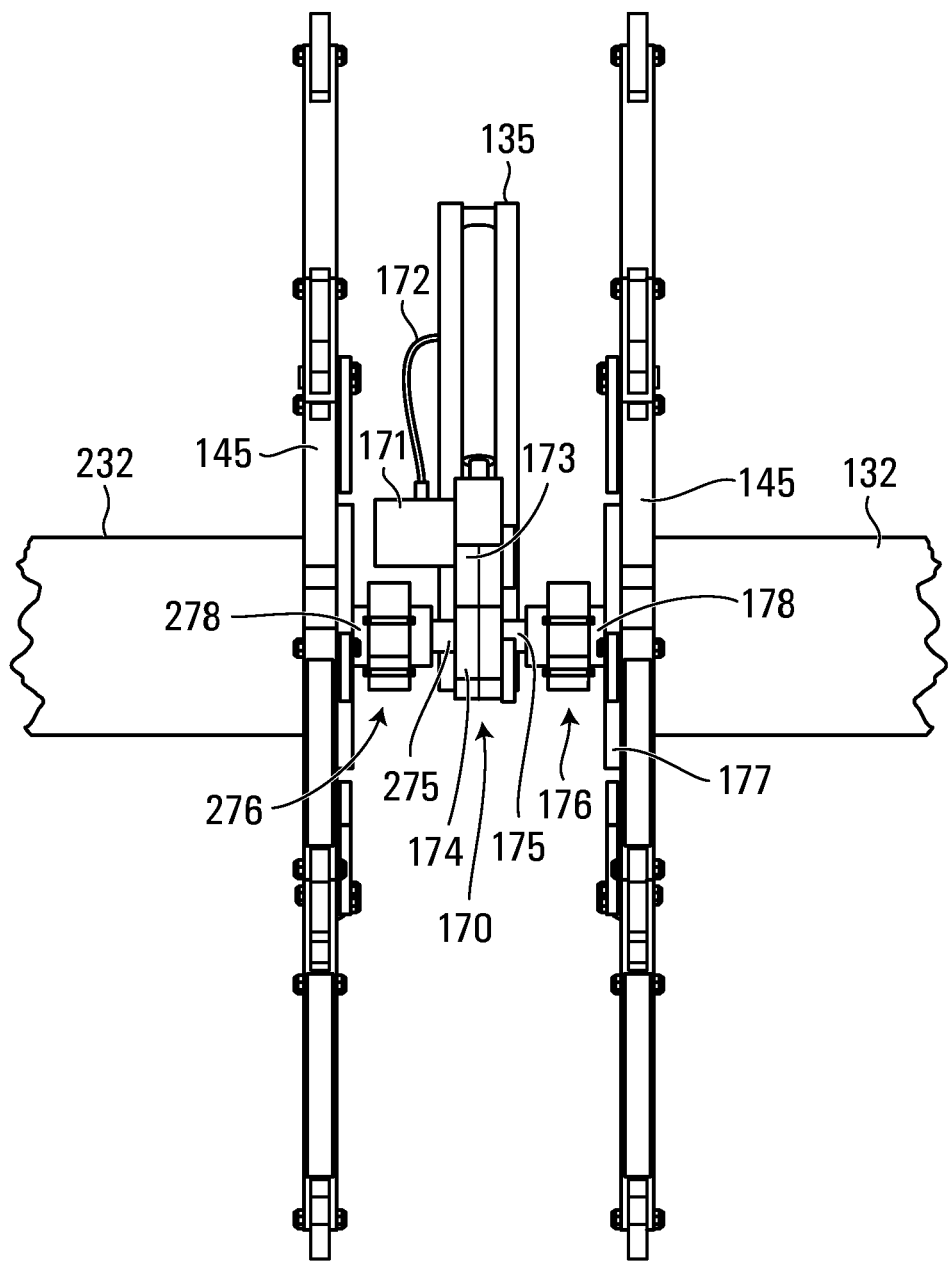
FIG. 10 is a front view of the header of FIG. 1, showing the connections between the reels and reel drive arm.

As indicated above, reel arms 134, 234 may be located at or proximate each of the opposite transverse ends of header 130 and a medial reel drive arm 135 and reel drive assembly 170 may be located substantially transversely at the middle of the header 130 between main reel tubes 132 and 232. With reference to FIG. 10, reel drive arm 135 may be provided with a reel drive assembly 170 which may include a hydraulic motor 171 connected to a hydraulic power source on combine harvester 50 through hydraulic line 172. Motor 171 may be connected with motor gear 173 (inside housing). Motor gear 173 may be mated to reel gear 174 within a reel gear housing. In one example embodiment, motor gear 173 and reel gear 174 may have a gear ratio of approximately 2.5:1, such that reel gear 174 and reel gear axles (such as reel gear axle 175 in FIG. 11), along with main reel tubes 132, 232 interconnected thereto may rotate between approximately 40-80 RPM during operation. Reel gear 174 may be fixedly connected to reel gear axle 175 such that both reel gear 174 and reel gear axle 175 rotate at the same time about sun axis S. Reel gear axle 175 may be connected to reel drive shaft 178 through joint device 176 (described in greater detail fully below). Reel drive shaft 178 can be fixedly connected to a dish-like plate 177 by means such as welding. Dish plate 177 may be fixedly attached to spider arms 145 positioned at the end of main reel tube 132 by means such as bolts and thus main reel tube 132 may be supported at its transversely inward end.

When a source of power is supplied to motor 171, motor gear 173 may be driven to rotate by motor 171. Rotation of motor gear 173 may cause reel gear 174 to rotate. Reel gear 174 may transmit the torque to reel gear axle 175, which in turn transmits torque to reel drive shaft 178 through joint device 176. Reel drive shaft 178 may transmit the torque to dish plate 178, which in turn may transmit the torque to spiders 145, causing reel 137 and in particular main tube 132 to rotate about sun axis S. Main reel tube 232 may be driven in a corresponding manner to main reel tube 132 with corresponding components as described above.

Figure 11:
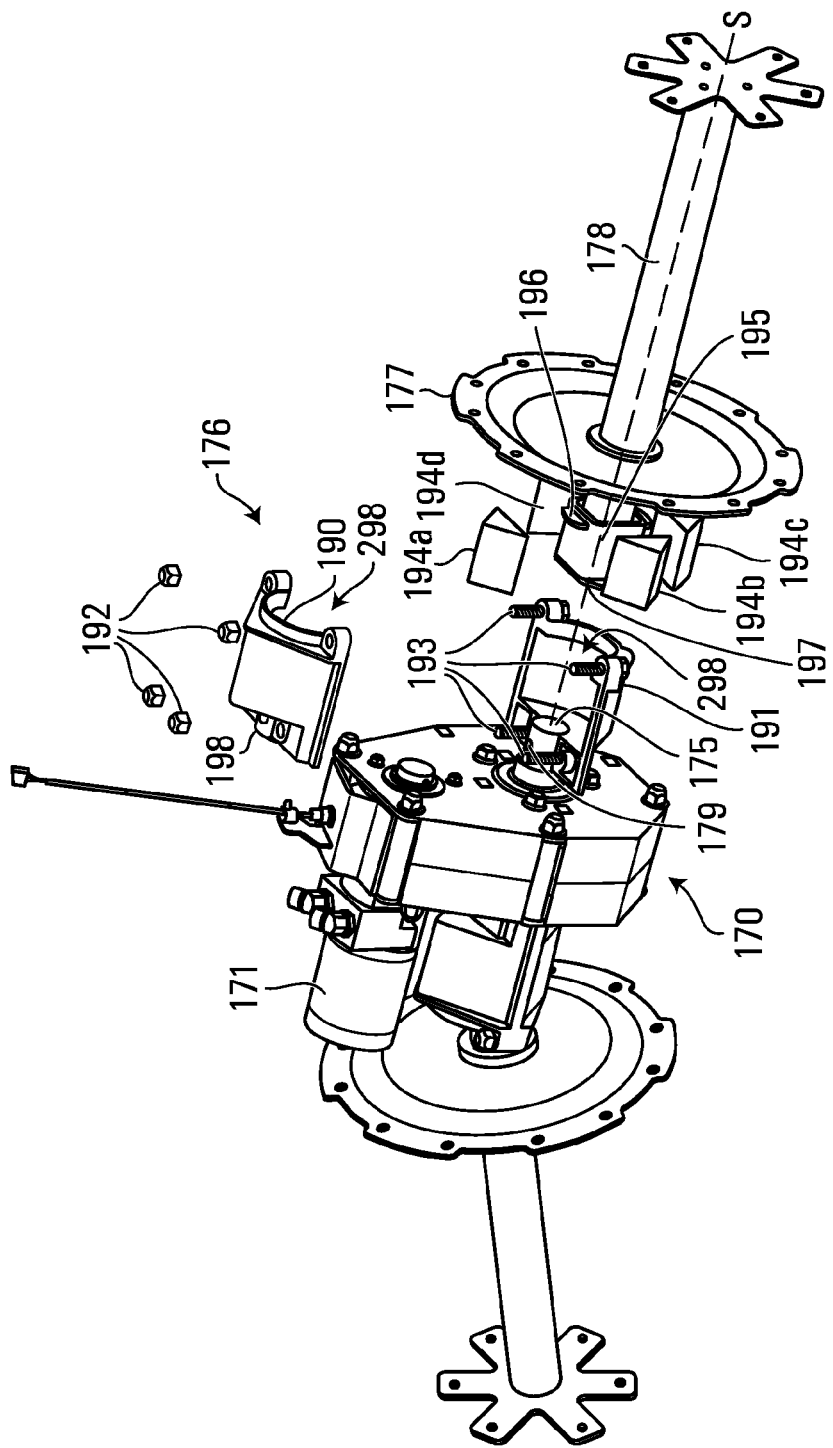
FIG. 11 is a partially exploded perspective view showing a joint device facilitating the interconnection between a reel drive assembly and reel drive shaft, with reel components omitted for clarity.
Figure 12:
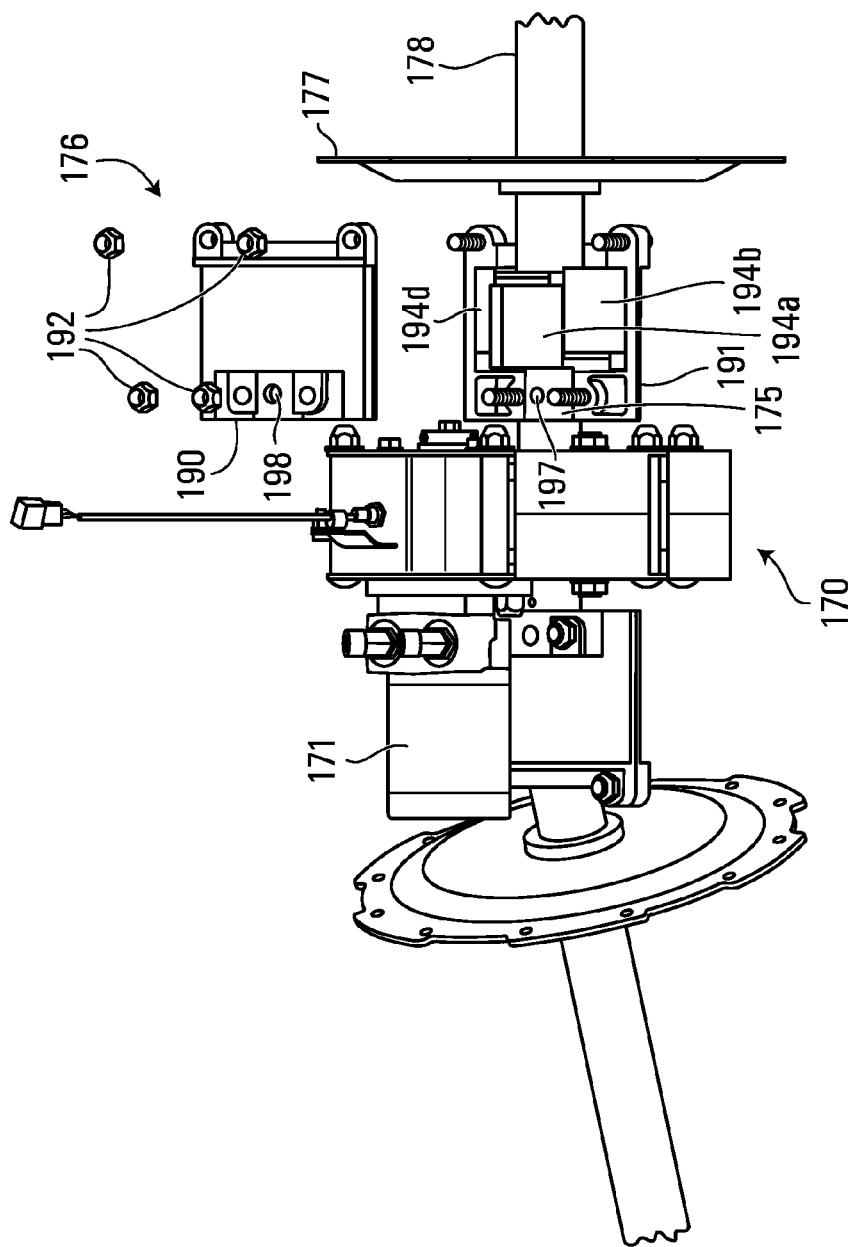
FIG. 12 is another partially exploded, and enlarged perspective view of the joint device and components of FIG. 11.
Figure 13:
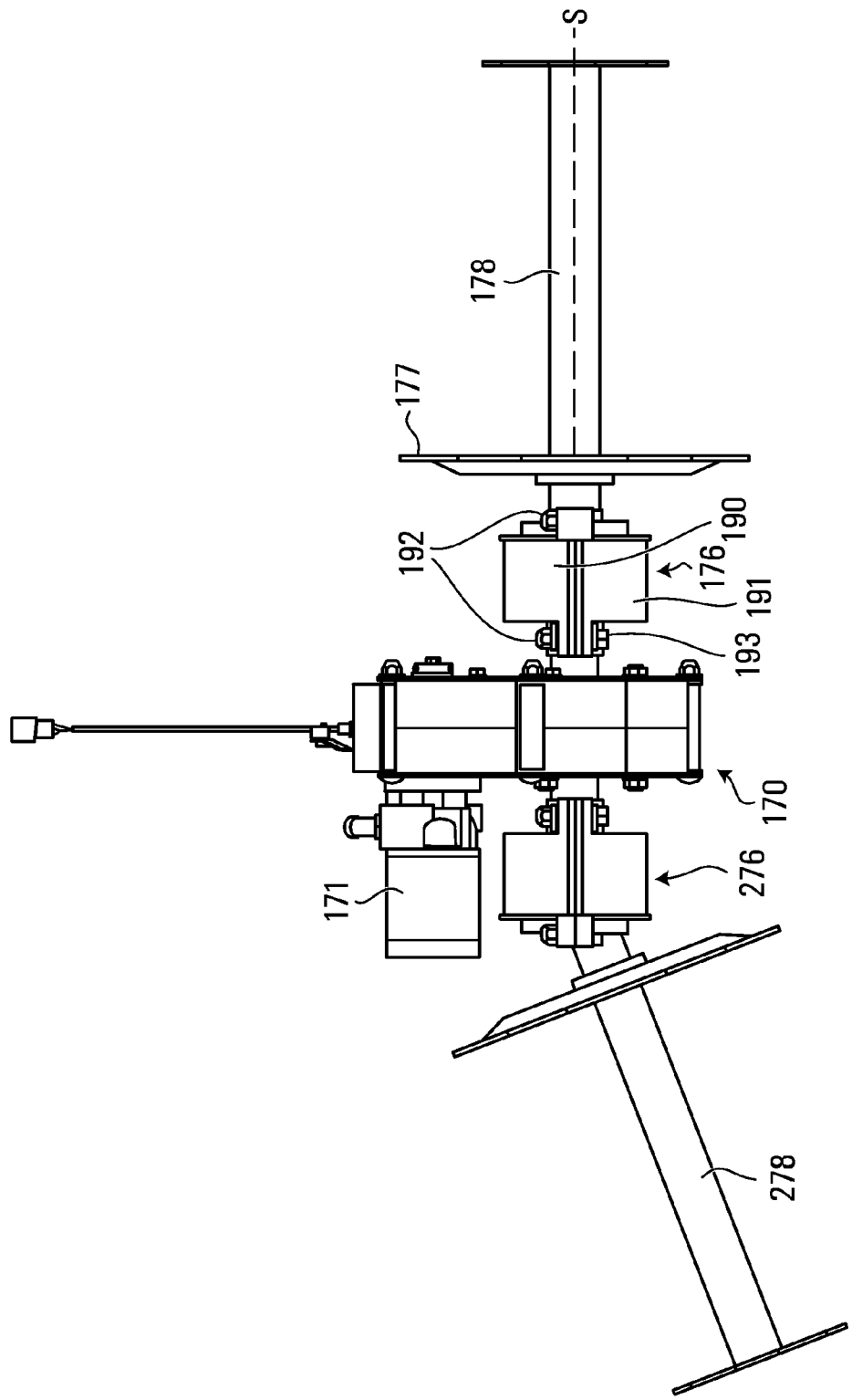
FIG. 13 is a front view of the joint device and interconnected components of FIG. 10.

With particular reference now to FIGS. 11-13, a joint device 176 may be comprised of an outer drive housing mated to an inner driven shaft arrangement by compliant material blocks which are triangular in shape. The outer drive housing may be comprised of an upper housing 190 and a lower housing 191 that each may be made of a durable material such as a strong metal like steel. Upper housing 190 and lower housing 191 may be provided with a plurality of corresponding bolt holes such that they may be connected together by means of bolts 193 and nuts 192. On a first end of joint device 176 proximate to reel drive assembly 170, upper housing 190 and lower housing 191 have portions that can co-operate to form a cylindrical shaped slot that can receive the cylindrical end of reel gear axle 175. The end portion of reel gear axle 175 received in the aforementioned slot may be provided with a bolt hole 179 corresponding with a bolt hole 198 on upper housing 190 and a bolt hole (not shown) on lower housing 191. When connected by means of nuts 192 and bolts 193, upper housing 190 and lower housing 191 can be clamped together and become frictionally engaged with reel gear axle 175 such that rotation of reel gear axle 175 about sun axis S also causes rotation of joint device 176 about sun axis S. A bolt (not shown) may also be placed through bolt hole 179 and corresponding bolt holes on the upper and lower housings 190 and 191 to act as a key to fixedly engage joint device 176 with reel gear axle 175 and assist in transmitting torque from reel gear axle 175 to interconnected upper and lower housings 190, 191.

A sleeve 195 may be fixedly attached (such as by welding) to the end of reel drive shaft 178 proximate to reel drive assembly 170. Sleeve 195 may be generally shaped as a hollow square shaped tube that fits over and is attached the end of reel shaft 178. The outer surface of sleeve 195 may configured such that sleeve 195 be may fit within the hollow cavity formed between interconnected upper housing 190 and lower housing 191 but not fit through the generally circular opening 298 (FIG. 11) on the output side of the joint device 176. Blocks 194a, 194b, 194c, and 194d, shaped generally as triangular prisms, may be provided and adapted to be received concurrently with sleeve 195 and the covered end of reel drive shaft 178 within the hollow cavity formed between upper housing 190 and lower housing 191. The blocks 194a-194d may be positioned within the aforesaid hollow cavity and be located between the outer surfaces of sleeve 195 and the inner wall surfaces defining the hollow cavity of upper housing 190 and lower housing 191. Each of blocks 194a-194d may be made of a material that can elastically deform to some extent. Examples of elastically deformable materials that may be employed may be polyurethane and natural rubber, or any other material with similar elastic properties. One face of each block 194a-194d may be configured to interface with a face of sleeve 195, while the other faces interface with the upper and lower housings 190 and 191, thereby keeping reel drive shaft 178 centrally located within joint device 176. Attached to sleeve 195 may be flanges 196 and 197, which protrude outwardly in each of the four directions from the outer surfaces of sleeve 195 and may have an arcuate shape. Flanges 196 and 197 may also operate to keep reel drive shaft 178 centrally located within joint device 176. The inner wall surfaces of upper housing 190 and lower housing 191 can co-operate to provide a generally square shaped interior wall surface that when blocks 194a-194d are in place, is offset by 45 degrees from the corresponding outward facing surface of square shaped tubular sleeve 195. This arrangement facilitates the ability of torque and force to be transmitted from the housings 190/191 through the blocks 194a-194d to the sleeve 195 and its fixedly interconnected reel drive shaft 178.

In operation, a source of power as described above drives reel gear axle 175. Reel gear axle 175 may transmit force and torque to interconnected upper housing 190 and lower housing 191 through clamped frictional engagement at the fixed connection point between joint device 176 and reel gear axle 175 and through the keyed connection of a bolt (not shown) passing through bolt hole 179 and corresponding bolt holes on the upper and lower housings 190 and 191. Upper and lower housing 190 and 191 can then act through their interior surfaces engaged with mating/adjacent surfaces of blocks 194a-194d to transmit the rotational force to blocks 194a-194d, which in turn may transmit the rotational force and torque to reel drive shaft 178 via the interface with sleeve 195. If reel drive shaft 178 becomes angularly displaced (up to as much as 45 degrees but typically not beyond 20 degrees) from axial alignment relative to reel gear axle 175, blocks 194a-194d may elastically deform, while still transmitting rotational force from reel gear axle 175 to reel drive shaft 178. Joint device 176 may therefore act as a flexible torsion joint connection which allows reel gear axle 175 and reel drive shaft 177 to remain coupled even when reel drive shaft 177 becomes angularly displaced to some extent relative to reel gear axle 175. The angle of deflection permitted is dependent on the material chosen for blocks 194a-194d, and the material may be selected for the desired performance characteristics in a given application. For example, it will be appreciated that softer materials such as natural rubber may permit greater angular deflection, but may be less efficient at transmission of torque than a harder material. With reference now to FIG. 13, a joint device 276 substantially identical to joint device 176 described above may be provided to connect reel drive assembly 170 to reel drive shaft 278, which is substantially identical to reel drive shaft 178. As shown, reel drive shaft 278 may be angularly offset relative to joint device 276, but may still be rotated about its own axis when provided with power by reel drive assembly 170.

Joint devices 176 and 276 as described above may also absorb torsional and angular shocks from reel drive shaft 178 and 278 respectively, which may occur for example if reel 137 hits a bump on the field or is caught on tangled crops or other foreign material, or that may occur during start up or shut down of power and torque from reel gear axle 175 and corresponding reel gear axle 275 (FIG. 10).

In another embodiment, joint device 176 may be designed as a frangible coupling by varying the design of blocks 194a-194d such that they may be caused to fail at a predetermined force/torque threshold. For example, blocks 194a-194d may be a solid made of wood, carbon fiber, phenolic, fiberglass, or other similar materials selected based on compression failure mode characteristics. Compressive failure of blocks 194a-194d may occur by crushing or by inelastic yielding, in such a way that blocks 194a-194d can no longer carry torsional loads. Alternatively, blocks 194a-194d may be designed for a frangible coupling using a relatively resilient or hard material such as acetal resin, acrylonitrile butadiene styrene (ABS), or ultra-high molecular weight (UHMW) polyethylene. This may be accomplished by shaping the blocks as hollow triangular prisms such that at a predetermined force threshold, the material may fail for example by buckling or cracking, thereby no longer able to carry loads. In this manner, a frangible joint device 176 may be used as a torque fuse that may prevent reel drive assembly 170 and motor 171 from damage if for example reel 137 is caught on tangled crops or other foreign material in the field, since any torsional force above the predetermined threshold associated with the blocks 194a-194d will cause failure in blocks 194a-194d in such a manner that joint device 176 can no longer transmit force and torque to reel drive assembly 170.

In another alternate embodiment, joint device 176 may be adapted for use as a constant velocity joint to transmit torque at a variable angle. This may be accomplished by modifying the shape of blocks 194a-194d, for example by rounding the ends of the triangular prism shape to permit some rolling movement of the blocks within the housing, thereby allowing reel drive shaft 178 to be displaced at a greater angle relative to reel gear axle than in other embodiments described above.

Joint devices 176 may be used in applications other than harvesting headers, as it may be adapted for use in any mechanical system involving a rotational power source and rotational output, including any systems where the input and output axes of rotation may be axially displaced. By way of example only, it may be adapted to be used in a conveyor belt drive assembly, a power take-off drive output, or a vehicle drive train.

As shown in FIGS. 1 and 2, reel 137 may also be provided with planetary gear reel end kit 140. Planetary gear reel end kit 140 (also referred to herein simply as "reel end kit 140") may be operable to engage with and cause each of the bats 138a-138f positioned around main reel tube 132 to rotate about sun axis S, and during at least part of the rotation about the sun axis S at the same time rotate about its own respective bat pivot axis 126a-126f. The rotation of each bat 138a-138f about its bat pivot axis 126a-126f can be controlled by a planetary gear assembly 103 (FIG. 3A) that links each bat to its own dedicated planetary gear system 101a-101f, as will be explained hereinafter. The plurality of fingers [tines] 102 that may be fixedly attached at approximately regular intervals along the length of bats 138a-138f may then have a path that is provided by: (a) rotation around sun axis S; and (b) during at least part of the cycle of rotation of each bat around sun axis S, rotation about the bat pivot axis 126a-126f associated with its respective bat. Such a combination of movements can provide a desirable path for each of the fingers [tines] 102 on each bat 138a-138f as the bats and the fingers [tines] attached thereto cycle around the main reel axis/sun axis S as the main reel tube 132 rotates.

Figure 4:
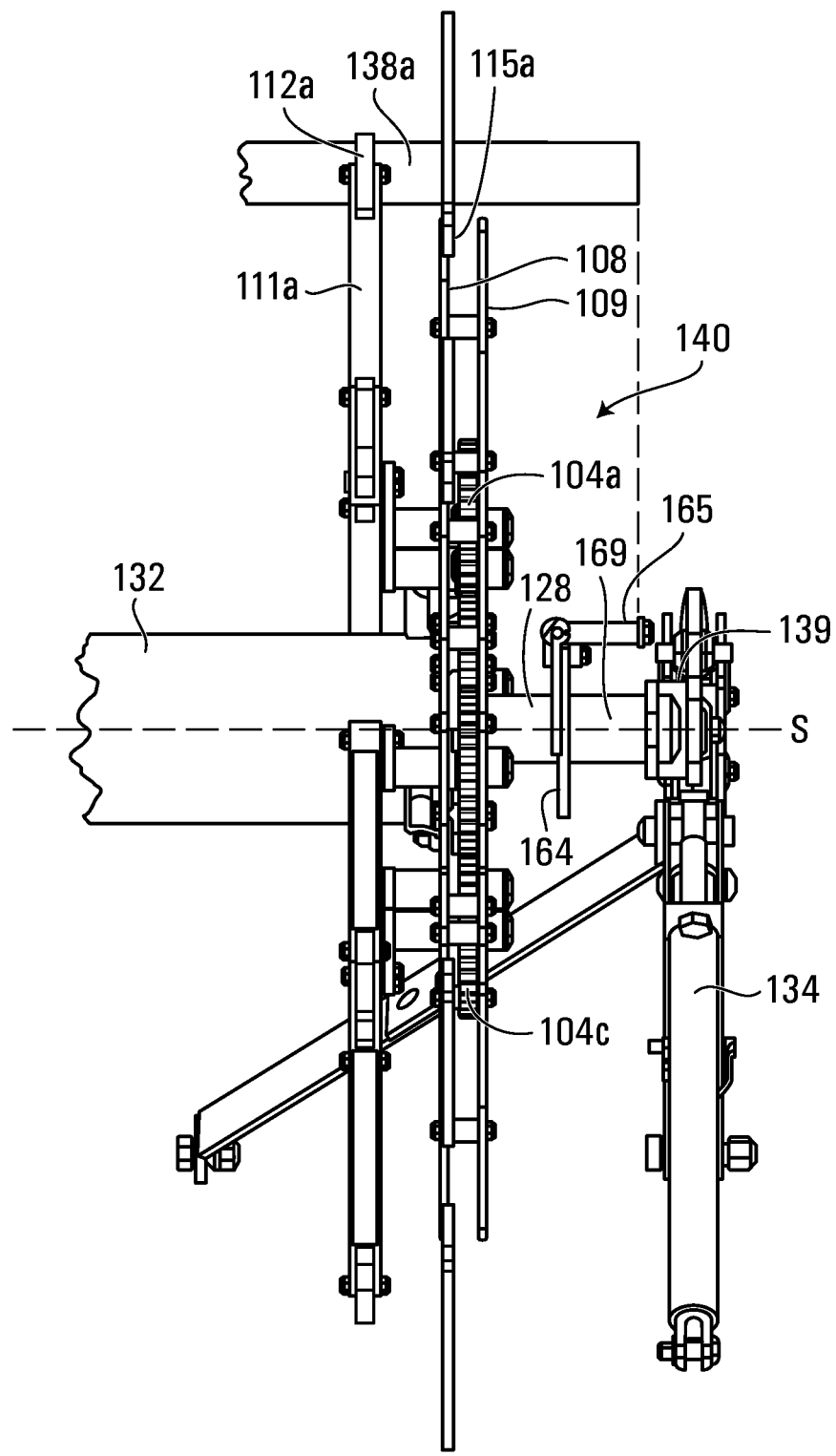
FIG. 4 is a front elevation view of the reel end kit, part of a reel bat and part of a main reel tube, of FIG. 2.
Figure 4A:
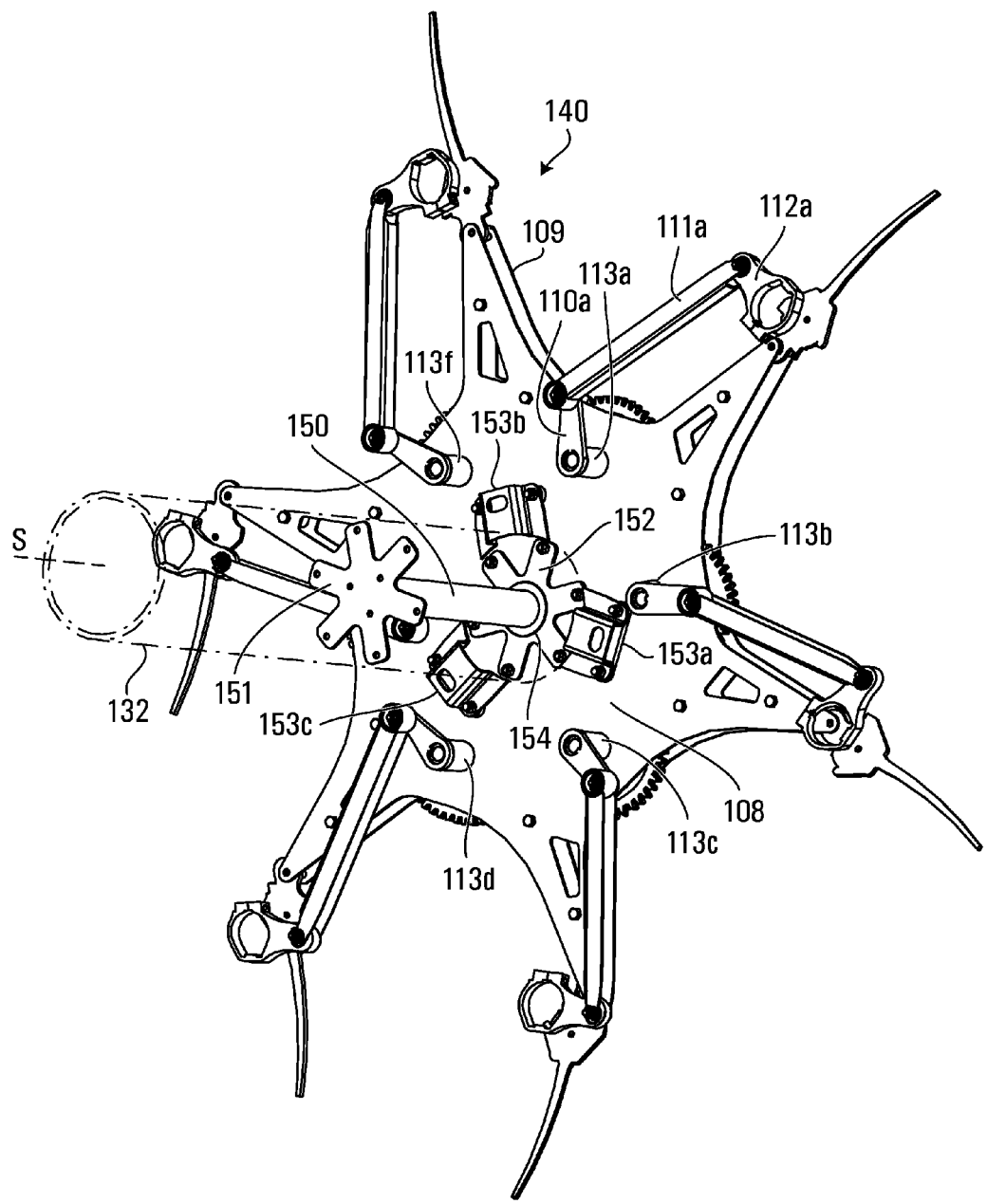
FIG. 4A is a perspective rear view of the reel end kit of FIG. 4.

With reference to FIGS. 1 and 4 in particular it may be noted that end kit 140 may be located inboard of the outward end of the reel bats such as reel bat 138a. This allows to the end of the reel bats 138a-138f to travel in a path where the end of each bat will pass quite closely to the inside surfaces of reel arm 134. Thus fingers [tines] 102, which may be positioned close to or at the outward end of each bat 138a-138f can also pass close to the inside surfaces of reel arm 134. If the control mechanism for the rotation of bats 138a-138f were mounted outside/outboard of the end of the bats then there would be a significant transverse gap between the end of the bats and the inside surfaces of the reel arm 134. This gap would allow material that is being drawn into reel 137 from passing into a significant gap between the end of the bats and the inside surface of reel arm 134 and potentially causing problems to the operation of the reel bat control mechanism. But in the illustrated embodiments, by mounting reel end kit 140 inboard of the outward end of reel bats 138a-138f, it can minimize or eliminate crop material that is being drawn into reel 137 from entering between the end of the bats and the inside surface of reel arm 134. It will also be appreciated that the components of end kit 140 are located entirely inboard radially of the cyclical path of the reel bats 138a-138f as the bats travel around the reel axis/sun axis S. Thus, the use of end kit 140 provides for a relatively space efficient and functionally effective reel design.

When attached to a piece of agricultural machinery such as combine harvester 50, reel 137 including planetary gear end kit 140 is generally positioned and configured such that forward movement of combine harvester 50 will allow fingers [tines] 102 of bats 138a-138f to engage standing crops and allow cutter bar 141 to cut standing crops as combine harvester 50 moves across a field. The height of reel 137 (e.g. combine reel lift adjustment) relative to the ground, cutter bar 141 and the crop to be cut may be adjusted by a linear actuator (e.g. a hydraulic or electric cylinder) 187 positioned between reel arm 134 and header frame 131 (FIGS. 1 and 3) and a second linear actuator (not shown) between reel arm 234 and header frame 131. The forward position of reel 137 (e.g. combine reel fore/aft adjustment) may also be adjusted by a linear actuator 186 positioned on reel arm 134 and a corresponding linear actuator (not shown) on reel arm 234. The operation of these linear actuators may be manually and/or computer controlled by suitable control systems known in the art.

With reference now to FIGS. 1-4A, planetary gear reel end kit 140 may include reel axle 150 and may further comprise two gear carrier plates 108 and 109, a planetary gear assembly 103 and a sun gear assembly 161 (FIGS. 3-4A). Gear carrier plates 108 and 109 may be made of any suitable durable material(s) such as by way of example only steel. The material may in some embodiments, by way of example only, be a sheet metal of a suitable thickness, such as by way of example 10 gauge sheet steel. Held between gear carrier plates 108 may be a combination of components that form planetary gear assembly 103 (FIG. 6) also made from one or more suitable durable materials such as steel. As particularly shown in FIG. 6, planetary gear assembly 103 may include a plurality of planetary gear systems 101a-101f, each of which may have a respective planetary gear 104a-104f that may be mounted about sun gear 106 of sun gear assembly 161. Planetary gear systems 101a-101f may also include various bat connecting/linking components which interconnect each of the planetary gears 104a-104f with a respective bat 138a-138f, as described hereinafter.

The components of reel end kit 140 may be mounted such that components other than reel axle 150 and end plate 151 are mounted onto reel axle 150, generally at an outward end portion thereof, but inboard of the location where axle 150 is supported by bearings 139 on reel arm 134 (see in particular FIGS. 3, 3A, and 4).

Sun gear assembly 161 that may be made of one or more suitable materials such as steel, may include sun gear 106 that may be fixedly attached at an outward facing surface thereof, to a sun gear disc plate 125 (FIGS. 3 and 3A) which can be received and held within a generally circular/cylindrical aperture in the outer gear carrier plate 109. Outer gear carrier plate 109, inner gear carrier plate 108 and the planetary gears 104a-f sandwiched there between, are rotatable about sun axis S relative to sun gear assembly 161 comprising sun gear 106, sun gear disc plate 125 and a sun gear timing adjustment mechanism (as described below).

Sun gear assembly 161 may be provided with a cylindrical tubular sleeve 128 (FIG. 3A) which at one end is attached to sun disc plate 125 and at the outer end to sun gear timing mechanism comprising sun gear adjustment plate 163 and handle 162. Sun gear timing plate 163 may be provided with a plurality of bolt holes arranged along an arc approximately equidistant from sun axis S. Sun gear assembly 161 may be connected to V-plate 164 by means of a bolt or pin 165 which may be secured to any one of the plurality of bolt holes on sun gear timing plate 163. V-plate 164 may be fixedly attached to a reel mount sleeve 169. By these means, sun gear assembly 161 remains fixed relative to V-plate 164 and reel arm 134 during operation such that it does not rotate about sun axis S during rotation of reel 137. The angular position of sun gear assembly 161 about sun axis S may be adjusted by removing bolt 165, and then using handle 162 to rotate sun gear assembly 161 to a desired setting, and re-inserting bolt 165 to a different bolt hole on sun gear timing plate 163. By this mechanism, the timing of movement of planetary systems 101a-f may be adjusted according to various requirements.

As may be evident from FIGS. 3 and 4, reel axle 150 may pass through openings at the center of sun gear assembly 161, in particular through sun gear disc plate 125, sleeve tube 128 and sun gear 106. Reel axle 150 can rotate about sun axis S while sun gear assembly 161, sun gear disc plate 125, sleeve tube 128 and sun gear 106 remain stationary relative to V-plate 164 and reel arm 134. Therefore, in operation, reel axle 150, main reel tube 132, gear carrier plates 108 and 109 and planetary gear assembly 103 are all rotatable together around sun axis S and rotatable relative to fixed sun gear 106, sun gear disc plate 125, sleeve tube 128 and sun gear assembly 161.

Figure 6A:
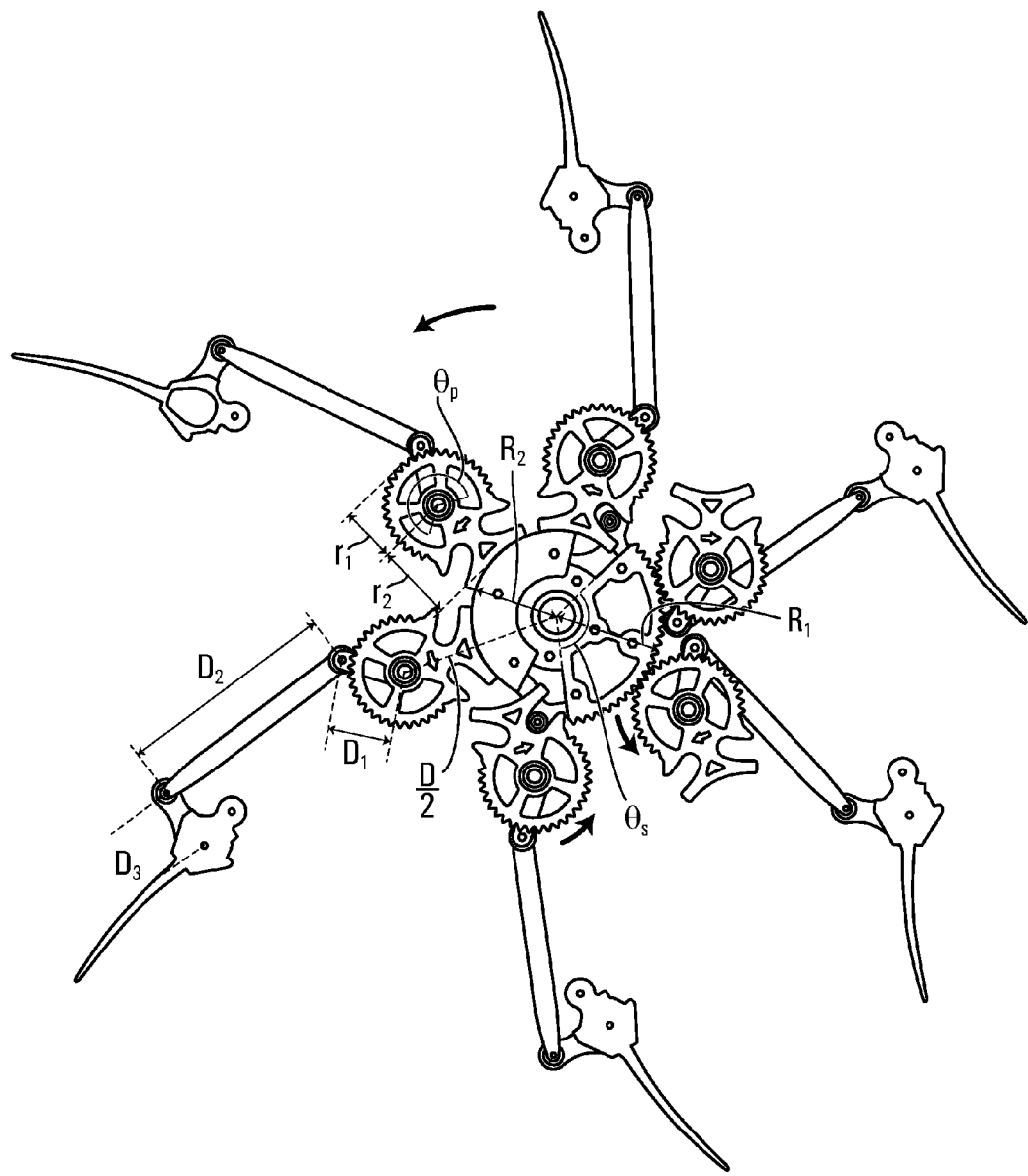
FIG. 6A is a schematic side elevation view of the reel end kit of FIG. 5 with gear carrier plates omitted for clarity.

With reference now to FIGS. 6 and 6A, a plurality (in the illustrated embodiment: six) functionally equivalent—and preferably substantially identical—planetary gear systems 101a-101f forming part of planetary gear assembly 103 may be rotatably mounted for rotation between gear carrier plates 108 and 109. Planetary gear systems 101a-101f may be mounted for rotation about planetary axes 120a-120f respectively. Planetary axes 120a-120f may be positioned at equal distances from sun axis S and at equal angular distances from each other. Planetary axes 120a-120f may each be oriented parallel to sun axis S. Only one planetary gear system 101a will be described herein in detail but it will be understood that planetary gear systems 101b-101f may be identical in structure and operation.

Planetary gear system 101a may be comprised of a planetary gear 104a and a bat connection mechanism that may consist of a gear crank arm 110a, connecting rod 111a, and bat crank arm 112a. Planetary gear 104a may be rotatably mounted on and between gear carrier plates 108 and 109 about planetary axis 120a. Planetary gear 104a may have a circular cylindrical protrusion proximate its center of, and extending from, both faces which may be configured to fit into corresponding circular cut-outs/hollow extensions 113a and 114a of gear plates 108, 109 positioned at planetary axis 120a on gear carrier plates 108 and 109 respectively. Gear carrier plates 108 and 109 may act as bearing surfaces to allow planetary gear 104a to rotate freely about planetary axis 120a between inner and outer gear carrier plates 108, 109 without substantial longitudinal movement along planetary axis 120a.

Figure 5:
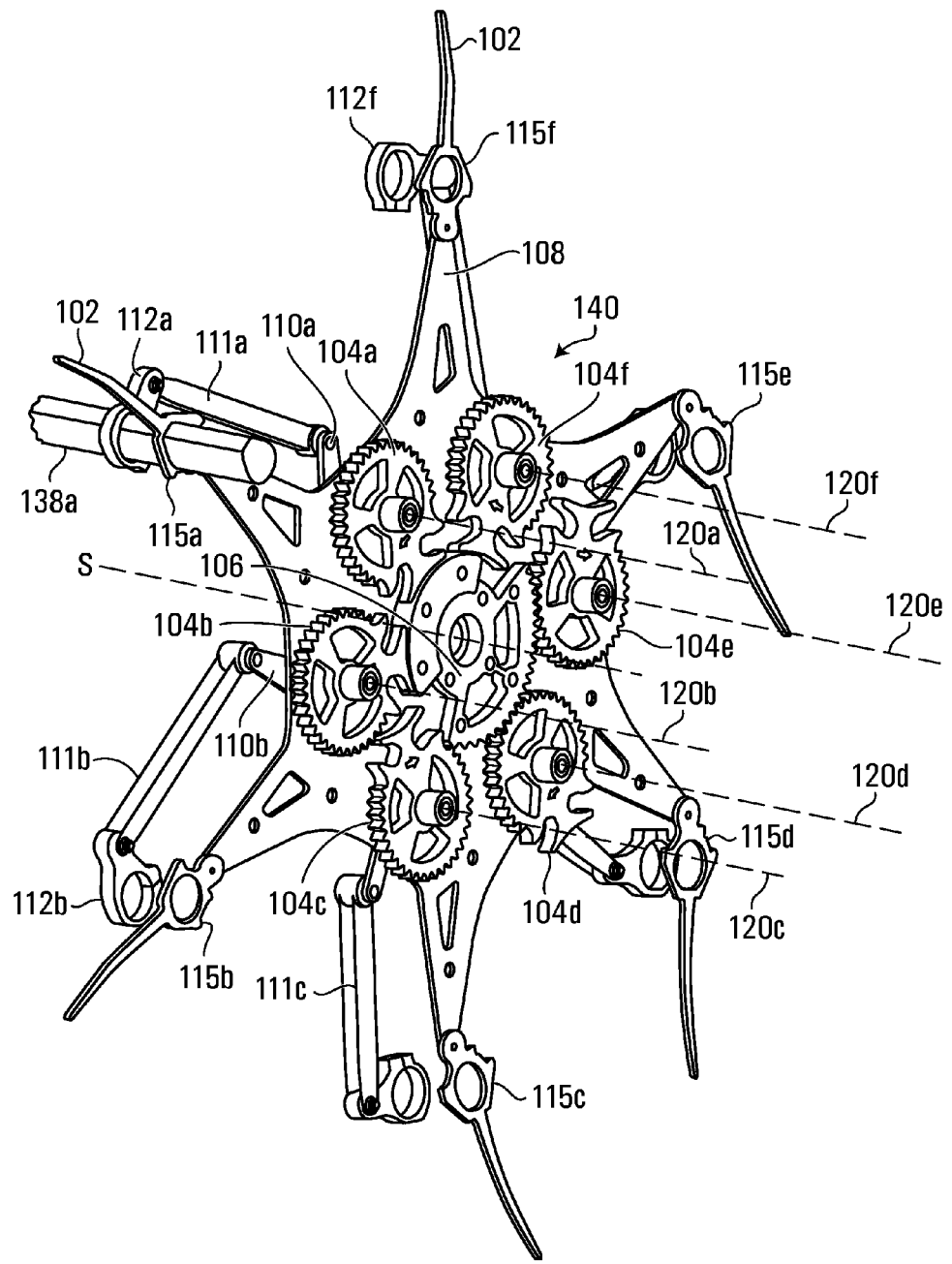
FIG. 5 is a perspective view of the reel end kit of FIG. 2 with a gear carrier plate omitted.

Planetary gear 104a can be interconnected to bat 138a with a bat connection mechanism. For example, planetary gear 104a can be fixedly attached to a gear crank arm 110a by a connection such as a keyed connection such that gear crank arm 110a rotates simultaneously with, and in fixed relation to, planet gear 104 about planetary axis 120a. Gear crank arm 110a may be attached to the end of a shaft connected to a respective planetary gear 104a-104f. The shaft may be an extension of the protrusion which rotatably mounts planetary gear 104a to inner gear mounting plate 108. The shaft may be received through cut-out 113 and have a key connection to the end of gear crank arm 110a. Bushings may be utilized to facilitate rotation of the cranks arms 110a-f, the planetary gears 104a-f, and their respective protrusions and shaft extension connecting with the cranks arms, relative to the inner gear carrier plate 109 and its cut-outs 113a-f. Due to the moments of forces applied through the gear crank arms 110a-f to the connecting rods 111a-f, bat crank arms 110a-f, and bats 138a-f, bearing/bushing elements are made from relatively strong materials such as metals. Distally positioned from the planetary gear connection point, gear crank arm 110a can be rotatably attached to a connecting rod 111a. Connecting rod 111a can be rotatably attached at or proximate its opposite end to a first end of a bat crank arm 112a. A second opposite end of bat crank arm 112a may be fixedly clamped onto or attached to bat 138a (see in particular FIGS. 5 and 6).

Additionally, gear carrier plate 108 may have a plurality of arms 188a-f and similarly gear carrier plate 109 may have a plurality of arms 199a-f. The arms of gear carrier plates 108 and 109 form six pair of arms 188a/199a to 188f/199f.

Each pair of arms 188a/199a to 188f/199f provides a pivotal sandwich connection with one of a respective pivot link 115a-115f. Each of the pivot links 115a-115f interconnects one of the pairs of arms 188a/199a to 188f/199f with a respective bat 138a-f. Thus bats 138a-138f may be rotatably connected to the distal end portions of arm pairs 188a/199a to 188f/199f by means of a pin joint to pivot links 115a-115f which may be fixedly clamped onto bats 138a-138f. Pivot links 115a-115f are rotatable/pivotable about bat pivot axes 126a-126f respectively, such that bats 138a-138f can pivot about bat pivot axes 126a-126f. The bat pivot axes 126a-126f are the same bat pivot axes that the bats rotate/pivot about as per the spider pivot links on the distal ends of the arms 145 of spiders 136 as described above. The bat pivot axes 126a-126f are located at a distance (offset) from the longitudinal centroid axes through the bats 138a-f.

As indicated above, in addition to providing a bearing surface for planetary gears 104a-104f and sun gear 106, the position of gear carrier plates 108 and 109 also form a sandwich-like construction for reel end kit 140 which may protect internal components and may facilitate the efficient installation and replacement of a reel end kit 140 on a reel 137 as a single unit. Gear carrier plates 108 and 109 may also structurally support bats 138a-f so as to eliminate a set of spiders that would otherwise be necessary on a reel 137 at an end of a reel tube 132.

Moreover, the construction and use of reel end kit 140 with planetary gear assembly 103 allows the reel end kit 140 to be mounted axially transversely inboard of the outermost ends of bats 138a-f. In other words, reel end kit 140 need not be attached directly to the outermost ends of bats 138a-f, but may be positioned transversely inward along sun axis S such that reel end kit 140 does not extend past the length of bats 138a-f. The use of reel end kit 140 may possibly improve engagement of the reel 137 with crop material by reducing interference compared to conventional bat movement mechanisms.

Planetary gear 104a may be configured with a toothed section 118a, a toothless section 119a, a first pivot index slot 121a, and a second pivot index slot 122a. Sun gear 106 may be similarly provided with a toothed section 116 and a toothless section 117. Toothed section 118a of planet gear 104a may be designed to engage with toothed section 116 of sun gear 106. Toothless section 119a of planetary gear 104a may be arc-shaped, with the concave side being configured so that it can be positioned directly facing sun gear 106. The radius of curvature of toothless section 119a may be substantially similar to the radius of curvature of toothless section 117 such that toothless section 119a may slide over toothless section 117 as planetary gear 104a rotates around sun gear 106. As planetary gear 104a passes over the toothless section 119a, it remains rotationally stationary, which results in a fixed finger [tine] orientation angle relative to the bat axis and planetary gear 104a.

First pivot index slot 121a of planetary gear 104a is shaped to engage with and receive therein an accelerator pivot pin 123. Pivot index slot 122a is shaped to engage with and receive therein a decelerator pivot pin 124. Accelerator pivot pin 123 and decelerator pivot pin 124 can be fixedly attached to sun gear assembly 161 and positioned such that first pivot index slot 121a will engage with accelerator pivot pin 123 and second pivot index slot 122a will engage with decelerator pivot pin 124 as planetary gear 104a rotates about sun axis S.

Referring now to FIGS. 6 and 6A, in relation to the illustrated embodiment, the relative dimensions of each part may be described more specifically in the following mathematical terms. Toothed section 116 of sun gear 106 has radius $R_1$. Toothless section 117 of sun gear 106 has radius $R_2$. Toothed section 118a of planetary gear 104a has radius $r_1$. The distance between planetary axis 120a and the center of toothless section 119a of planetary gear 104a is $r_2$. The distance between sun axis S and planetary axis 120a is D/2. $R_1$, $R_2$, $r_1$, and $r_2$ are governed by the following relationship:

$$D/2 = R_1 + r_1 = R_2 + r_2$$

Thus the distance D/2 between sun axis S and planetary axis 120a can be selected so that it remains constant during the orbit of planetary gear 104a about sun axis S, resulting in a substantially circular orbit. The radius of curvature of the curved surface of toothless section 117 of sun gear 106 is $1/R_2$, and the radius of curvature of toothless section 122a of planetary gear 104a can be selected to that it is also approximately $1/R_2$. The arc angle of toothed section 118a of planet gear 104a is given by $\theta_p$, and the arc angle of toothed section 116 of sun gear 106 is given by $\theta_s$. The arc length of toothed section 118a and toothed section 116a can be chosen to be substantially identical, such that $r_1 \theta_p = R_1 \theta_s$.

It will be appreciated that if the reel 137 is generally rotated about the sun axis at an angular velocity of W1, the angular velocities of the corresponding planetary gears 104a-104f when positively engaged with the sun gear 106 will depend upon the selected gear ratios (i.e. the ratios of the radius of the toothed section 116 of the sun gear 106 to the radiuses of the toothed sections 118a-f of the toothed sections of the planetary gears 104a-f).

It may be appreciated that the particular configuration, size and shape of the planetary gears 104a-104f relative to the configuration, size and shape of the sun gear 106 will determine the movement of the planetary gears and the corresponding movement of the bats 138a-f and fingers [tines] 102 that are interconnected to the planetary gears 104a-f. The combination of the length of the arcs of the toothed section 118a-f, the angular position where the toothed sections 118a-f start and stop and the angular velocity of the planetary gears 104a-f will at least in part, determine the profile of movement. It will be appreciated that for example, the longer the arcs of the toothed sections, the greater range of rotation of the bats and the fingers [tines] secured thereto.

Additionally the transition from rotation to non-rotation of each planetary gear 104a-f can be controlled by the relative positioning of an accelerator pivot pin 124 and a decelerator pivot pin 123 and interaction of the accelerator pivot pin 124 and the decelerator pivot pin 123 with the first and second pivot index slots 121a-121f and 122a-122f. In the embodiment illustrated in FIG. 6A, the relative angular positions of the fixed sun gear elements may be provided as follows. Using decelerator pivot pin 124 as reference (0°), in the counter-clockwise direction, toothless section 117 of sun gear 106 may span approximately from 18° to 180°. Accelerator pivot pin 123 may be positioned at approximately 198°. Toothed section 116 of sun gear 106 may span approximately from 212° to 340°. The interaction of the accelerator pivot pin 124 and the decelerator pivot pin 123 with the first and second pivot index slots 121a-121f and 122a-122f respectively controls the engagement and the disengagement of the planetary gears 104a-104f and ensures that the toothed portions of planetary gears 104a-104f will properly engage with, and disengage from, the toothed portions sun gear 106 at appropriate times during the cyclical motion around sun gear 106.

In the example embodiment of FIG. 6A, the relative dimensions of parts comprising planetary system 101a and sun gear 106 may be provided as follows. Gear crank arm 110a has length $D_1$ as measured from planetary axis 120a to the center of the pin connection with connecting rod 111a. Connecting rod 111a has length $D_2$ as measured between the pin connections with gear crank arm 110a and bat crank arm 112a. Bat crank arm 112a has length $D_3$ as measured from the pin connection with connecting rod 111a to the centroidal axis of bat 138a. The ratio $D_1:D_2:D_3$ is approximately 1:3.3:1. The ratio $r_1:D_1$ is approximately 4:5, and the ratio $r_1:r_2$ is approximately 4:6. The relative dimensions described above are preferred for the current configuration of reel tube diameter, reel bat operating circumference, and other variables. Aspects will deviate from a formula applied to the current design, if, for example, more or less than six bats where used. The same ratios described above may be used for embodiments containing less than six bats, and the design of planetary members 101a-f need not change for such embodiments. For embodiments with more than six bats, it may be necessary to construct a reel with larger diameter to accommodate the aforementioned parts in the available space with sufficient clearance for movement. In such a case, the same ratios may generally be used but the size of each part must be varied to accommodate the larger diameter reel.

The design and selection of gear ratios and dimensions of the parts described above depend on a variety of considerations, including the reel tube size and diameter, the number of bats, radial distance of the bats from the reel axis, size and number of teeth on planetary and sun gears, material type, and physical clearance between the moving parts. In various embodiments, a desired position or radius for the bats or bat pivot axes 126a-126f may first be determined and then a desired rotation of the bats during use may be determined. The design and selection of gear ratios and dimensions of parts may then be chosen based, at least in part, on the desired position or radius of the bat axes 126a-126f and the desired rotation of the bats.

In various embodiments, a ratio of the radii of toothed sections of the planet gears and the sun gear may be set to facilitate a desired rotation or movement of the bats as they travel about the sun gear, while avoiding clearance problems. For example, in various embodiments, the ratio of $r_1$ to $R_1$ may be set to about 7:11.

It will be apparent that various dimensions provided above may be varied according to the operational requirements of reel 137 and the desired movement profile of the fingers [tines] 102 attached to each of bats 138a-f. For example, variations in the lengths $D_1$, $D_2$, and $D_3$ will affect the range of motion and position of bats 138a-f and their fingers [tines] 102 during the rotational cycle of planetary gear assembly 103. These lengths may be chosen to optimize the path of motion of bats 138 and fingers [tines] 102 with the aid of computer design software such as 3D CAD.

An example method for assembling planetary gear reel end kit 140 and installing on reel 137 is provided as follows. Referring to FIGS. 3, 3A, 4, and 4A, planetary gear reel end kit may be assembled by the following steps. First, gear carrier plate 108 can be connected to reel axle 150 by sliding reel axle 150 through a centrally located circular cut-out on gear carrier plate 108 until it reaches collar 154 and connection plate 152. This step may be performed while carrier gear plate 108 is oriented generally horizontally such that reel axle 150 is slid vertically up through gear carrier plate 108. Gear carrier plate 108 may next be fixed to reel axle 150 by affixing connection plate 152 to gear carrier plate 108 with bolts. Next, with reel axle 150 attached to gear carrier plate 108, sun gear assembly 161 may be put into position by sliding it onto and along reel axle 150 until it comes into contact with gear carrier plate 108. Next, with sun gear assembly 161 in place, planetary gears 104a-f may be placed one at a time on corresponding cut-outs 113a-f on gear carrier plate 108. Specifically, planetary gear 104a may be placed on circular cut-out 113a on gear carrier plate 108, such that it is mated to sun gear 106 in a position as described above. Once planetary gear 104a is in place, sun gear assembly 161 may be rotated using handle 162, and a second planetary gear 104b may be placed onto gear carrier plate 108. Placement of planetary gears and rotation of sun gear assembly 161 may be repeated until all planetary gears 104a-f are in place. This allows planetary gears 104a-f to be installed easily while maintaining proper mating with sun gear 106. In the next step, planetary gear systems 101a-101f may be substantially completed so as to allow the planetary gear assemblies 101a-101f to interconnect each of bats 138a-138f to its respective planetary gear 104a-104f. This can be accomplished by attaching each of gear crank arms 110a-f to the end of a shaft attached to a respective planetary gear 104a-104f, such shafts which are received through cut-outs 113a-f and which may be extensions of the protrusions which rotatably mount planetary gears 104a-f to inner gear mounting plate 108. Connecting rods 111a-f may have one end interconnected to the distal end of gear crank arms 110a-110f and the opposite end attached to an end of bat crank arms 112a-f. The other end of each of the bat crank arms 112a-112f may be provided with an adjustable bracket 107a-107. When gear reel end kit 140 is mounted onto the main tube 132, the bat crank arms 112a-112f may be fixedly secured to the bats 138a-138f at an appropriate position and orientation. The foregoing allows each bat 138a-138f to be interconnected to their respective planetary gear 104a-f when the real end kit is mounted onto the header.

In the next step, outer gear carrier plate 109 is put into position by sliding it along (and maybe vertically down) reel axle 150 until it forms the sandwich construction as described above with gear carrier plate 108. Gear carrier plate 109 may be secured to gear carrier plate 108 by bolts. This then completes the construction of the reel end kit 140.

Next, planetary gear end kit 140, now assembled, may be attached to reel mount plate 166 by sliding reel axle 150 into reel mounting sleeve 169 and attaching snap ring 167 to collar 168 on reel axle 150. The angular position of sun gear assembly 161 may be selected as described above by choosing one of the plurality of bolt holes on sun gear timing plate 163 to connect with V-plate 164. Next, planetary gear end kit 140 may be placed into main reel tube 132 by sliding the interior free end of reel axle 150 and end plate 151 into the center of main reel tube 132. Main reel tube 132 may then be secured to planetary gear end kit 140 by bolting cleats/brackets 153a-c to corresponding bolt holes on gear carrier plate 108. Finally, planetary gear end kit 140, now secured to main reel tube 132, may be attached to reel arm 134 by bolting reel mount plate 166 to reel arm 134. Main reel tube 132, axle 150 and end kit 140 may thus be supported at the outward end of the reel by the attachment to reel arm 134.

It will be appreciated from the foregoing that the planetary gear reel end kit 140 may be replaced as an entire unit onto reel 137 without replacing other components of reel 137, thereby allowing efficient and timely repairs and maintenance of planetary gear end kit 140.

In operation, a source of rotational power on reel drive arm 135 as described above drives main reel tube 132 in rotation about sun axis S, thereby causing rotation of reel 137 including bats 138a-f and their fingers [tines] 102 and planetary gear systems 101a-f also about sun axis S. Consequently, planetary gears 104a-104f are caused to rotate around stationary sun gear 106.

It will be convenient to describe the motion of planetary gear systems 101a-101f in phases as the gear carrier plates 108, 109 are driven in counter-clockwise rotation around sun axis S and about fixed sun gear 106. As planetary gears 104a-104f attached to carrier gear plates 108, 109 move counter-clockwise in orbit about sun axis S, each planetary gear 104a-104f moves through a dwell phase, an acceleration phase, a rotational phase, and a deceleration phase.

With reference now to FIG. 6, planetary gears 104a and 104b are examples of planetary gears in the dwell phase of orbit. During the dwell phase, toothless section 119a/119b of planetary gears 104a/104b respectively are engaged with toothless section 117 of sun gear 106, causing planetary gears 104a/104b to rotate about sun axis S without significant rotation about planetary axis 120a/120b respectively. During the dwell phase, gear crank arms 110a/110b are held in an angularly fixed position relative to planetary axis 120a/120b. Connecting rod 111a, bat crank arm 112a, and bat 138a are therefore also held in a fixed position relative to planetary axis 120a during this dwell phase. Fingers [tines] 102 attached to bat 138a are thereby locked in a fixed relative position to bat 138a and planetary gear 104a, generally perpendicular to the direction of motion of bat 138a. Similarly, fingers [tines] 102 attached to bat 138b are thereby locked in a fixed relative position to bat 138b and planetary gear 104b, generally perpendicular to the direction of motion of bat 138b. Planetary gears 104a/204b continue to move along an arc about sun axis S until they each in turn reach the position depicted in FIG. 6 by planetary gear 104c. In FIG. 6, planetary gear 104c is shown entering the acceleration phase.

In the acceleration phase, as depicted by planetary gear 104c in FIG. 6, toothless section 119c of planetary gear 104c disengages with toothless section 117 of sun gear 106 while first pivot index slot 121c engages with accelerator pivot pin 123, thereby pivoting planetary gear 104c about planetary axis 120c until toothed section 118c of planetary gear 104c engages and meshes with toothed section 116 of sun gear 106. Once the teeth of planetary gear 104c has engaged with sun gear 106, it moves into the rotational phase as depicted for example by planetary gear 104d. During the acceleration phase, gear crank arm 110c begins to rotate about planetary axis 120c, thereby transmitting a force to bat crank arm 112c through connecting rod 111c. The force transmitted to bat crank arm 112c, which is fixedly clamped to bat 138c, causes bat 138c to move in an arc about bat pivot axis 126c. Fingers [tines] 102 attached to bat 138c are therefore caused to rotate counter-clockwise about bat pivot axis 126c. Bat 138c is also extended radially away from sun axis S by the combined action of gear crank arm 110c and connecting rod 111c.

In the rotational phase, as depicted for example by planetary gear 104d in FIG. 6, toothed section 118d of planet gear 104d is engaged with toothed section 116 of sun gear 106. As planetary gear 104d is driven in a counter-clockwise in orbit about sun axis S, it also rotates counter-clockwise about planetary axis 120d. During this rotational phase, gear crank arm 110d also rotates counter-clockwise about planetary axis 120d. As gear crank arm 110d sweeps in an arc towards sun axis S, it pulls connecting rod 111d closer to sun axis S and thereby causes a rotation in bat crank arm 112d about bat pivot axis 126d in a direction opposite to the motion of planetary gear 104d (clockwise) around sun gear 106. Rotation of bat crank arm 112d causes bat 138d to move in an arc about pivot axis 126d, causing fingers [tines] 102d to also rotate in the same direction as bat 138d.

In the rotational phase, between that depicted by planetary gear 104d in FIG. 6, and that depicted by planetary gear 104e in FIG. 6 each planetary gear 104a-f will continue to move counter-clockwise in orbit about sun axis S, and also rotate counter-clockwise about its respective planetary axis 120a-120f. During this rotational phase, each gear crank arm 110a-110f also continues to rotate counter-clockwise about its planetary axis 120a-120f. As each gear crank arm 110a-110f continues to sweeps in an arc eventually it reaches its closest position in relation to sun axis S and then starts to move away from sun axis S. In doing so, it starts to push connecting rod 111a-111f away from sun axis S and thereafter move to the position shown in FIG. 6 by gear crank arm 110e thereby causing a rotation in bat crank arm 112e about bat pivot axis 126 in the same direction to the motion of planetary gear 104 around sun gear 106. By way of example in FIG. 6, further rotation of bat crank arm 112e will cause bat 138e to move in an arc about pivot axis 126e, causing fingers [tines] 102e to also rotate in the same direction as bat 138e. Each planetary gear 104a-104f continues an orbital motion about sun axis S until it reaches the deceleration phase as depicted by planetary gear 104f in FIG. 6.

In the deceleration phase, second pivot index slot 122f of planetary gear 104f is shown engaged with decelerator pivot pin 124. The force applied by decelerator pivot pin 124 as its engages second pivot index slot 122f counteracts the rotational movement of planetary gear 104f, which pivots planetary gear 104f about planetary axis until toothless section 119f is brought into engagement with toothless section 117 of sun gear 106. Decelerator pivot pin 124 will then disengage from second pivot index slot 122f as planetary gear 104f continues to orbit about sun axis S and planetary gear 104f is shown just entering the dwell phase. During the deceleration phase, gear crank arm 110f has returned to its initial position in the dwell phase, causing fingers [tines] 102f also to return to a position where they oriented approximately perpendicular to the direction of motion. With further rotation of the planetary gears 104a-104f around sun gear 106, when each planetary gear 104a-104f reaches the position depicted by planetary gear 104a, the cycle of motion is complete and accords with one complete cycle of rotation of reel 137. The movement just described can hereafter be repeated during each rotation of main reel tube 132/reel 137.

Figure 8:
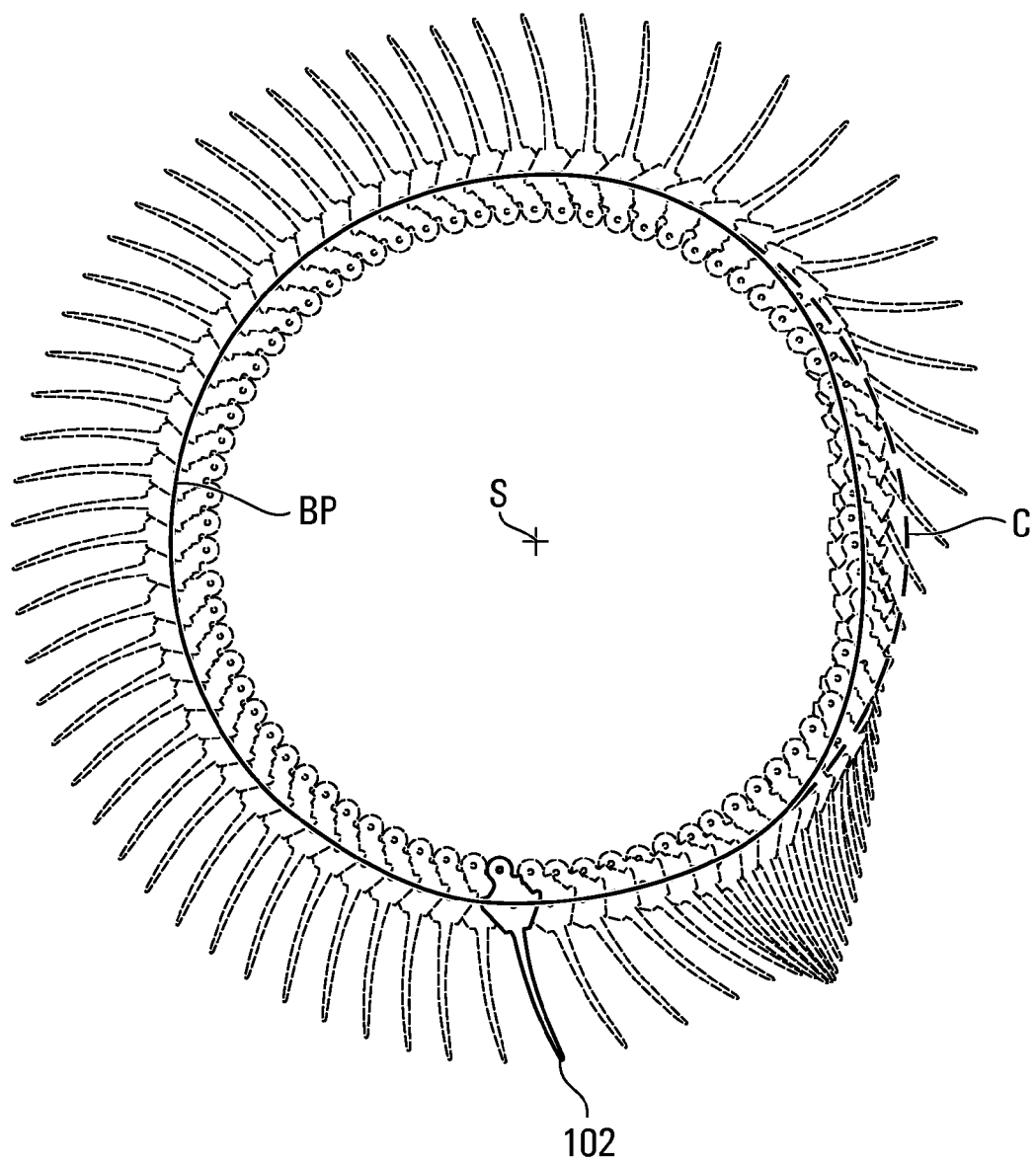
FIG. 8 is a schematic side view showing a time-lapse of a sample path followed by bats and fingers [tines] of the planetary gear reel of FIG. 5.
Figure 8A:
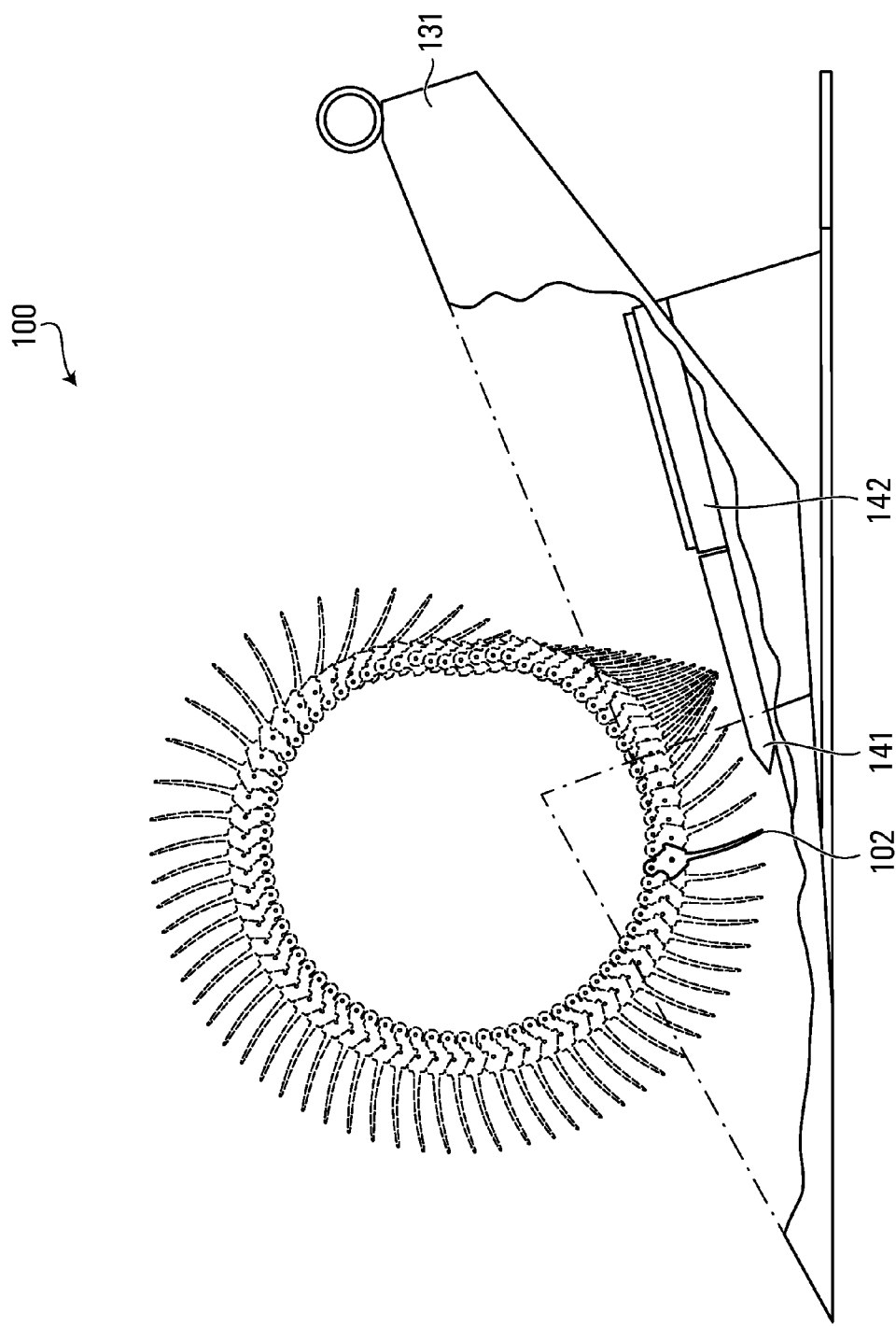
FIG. 8A is a schematic side view of the time-lapse of FIG. 8, showing the position of fingers [tines] and bats in relation to some other components of the header of FIG. 1.

Referring now to FIGS. 8 and 8A, the behavior and movement of bats 138a-138f and fingers [tines] 102 during one cycle of rotation of reel 137 are shown in greater detail. Bat path BP is created by tracing the path of motion of any one of bats 138a-138f during a given cycle of motion. It will be seen that bat path BP forms a complex non-circular shape due to the combination of rotational motion about sun axis S, variations in radial distance from sun axis S caused by planetary members 101a-101f, and the arc motion of bats 138a-138f about bat pivot axes 126a-126f. The motion of bats 138a-138f also causes fingers [tines] 102 to move in a complex manner. It will be appreciated that bat path BP may be modified by varying the dimensions and shapes of the parts described above so as to optimize bat path BP for different applications. In the embodiment described herein, bat path BP is chosen such that bats 138a-138f reach a maximum radial distance from sun axis S near the front of the reel and a minimum radial distance from sun axis S near the rear of the reel. Complex bat path BP may facilitate engagement of crops by fingers [tines] 102 at its maximum extension, and increase clearance distance to the rearward components of header 130 at its minimum extension. As compared to a circular path C about sun axis S, it can be seen that bat path BP allows bats 138*a-f* to reach further radially from sun axis S when engaging crops to be cut and retract more toward sun axis S when moving past other components of the header, during various portions of the movement cycle.

Figure 9:
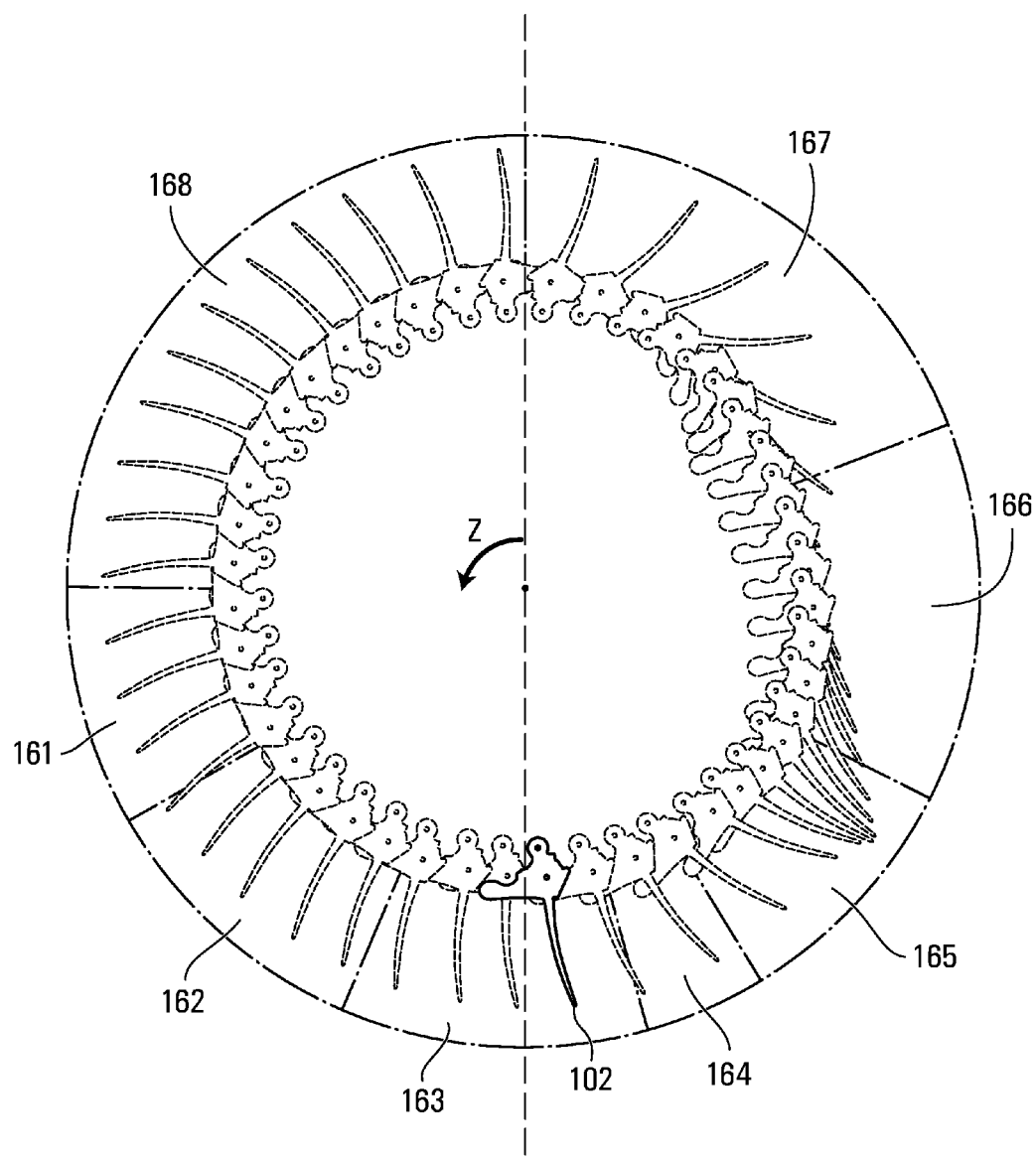
FIG. 9 is an additional schematic side view demonstrating zoned areas of the path followed by bats and fingers [tines] of the planetary gear reel of FIG. 5.

It will be convenient to describe the motion of fingers [tines] 102 as each bat and the fingers [tines] provided thereon, travel through different activity zones as illustrated in FIG. 9. The illustrations of the finger path and pattern are provided are an example working embodiment, but only roughly shown in relation to ground [down/bottom is generally ground]. Adjustments to the timing can rotate the finger pattern clock/anti-clock wise according to operating requirements in different harvesting conditions. In one embodiment, in a crop entry zone 161 (that may extend from an axis substantially orthogonal to the ground, at an angle Z from about 90 degrees to about 120 degrees fingers [tines] 102 are oriented generally perpendicular to the counter-clockwise direction of rotational motion of planetary gears 104*a*-104*f* about the sun axis. This finger orientation when combined with the forward motion of header 130 as combine harvester 50 moves through a field holding a crop may allow fingers [tines] 102 to engage crops without crop pushover. In a gather zone 162 (that may extend at an angle Z from about 120 degrees to about 155 degrees), fingers [tines] 102 remain generally perpendicular to the rotational motion of planetary gears 104*a*-104*f* about the sun axis. At this stage fingers [tines] 102 and bats 138*a*-138*f* may sweep engaged crops toward header 130. In a pick-up zone 163 (that may extend at an angle Z from about 155-195 degrees to about 190, fingers [tines] 102 remain oriented generally perpendicular to the direction of rotational motion of planetary gears 104*a*-104*f* about the sun axis, but are extended to the maximum distance from sun axis S by the action of planetary members 101*a*-101*f* as described above. Extension of fingers [tines] 102 in pick-up zone 163 may further engage downed crops that may otherwise be missed.

In a lift zone 164 (that may extend at an angle Z from about 195 degrees to about 210 degrees) the tips of fingers [tines] 102 rapidly move in an upward trajectory so as to lift any engaged crops over cutter bar 141 on header 130 with a quick "flip"-like motion that efficiently clears the cutter bar and moves the crop into the conveyance zone. The lifting motion of fingers [tines] 102 combined with forward motion of header 130 may cause engaged crops to be cut by cutter bar 141, allowing engaged crops to be collected. In a sweep zone 165 (that may extend at an angle Z from about 210 degrees to about 240 degrees), fingers [tines] 102 continue to move in a sweeping or raking motion in an arc, moving any cut crop material still engaged with fingers [tines] 102 toward collection deck 142 of header 130. The rotational movement of bats 138*a*-138*f* may also clear the area above cutter bar 141 to prevent crop material build up and move crops toward collection deck 142.

In a release zone 166 (that may extend at an angle Z from about 240 degrees to about 290 degrees), fingers [tines] 102 rotate about bat pivot axes 126*a*-126*f* in a direction contrary to the rotational motion of planetary gears 104*a*-104*f* about the sun axis, such that fingers [tines] 102 become aligned generally parallel to the direction of motion of bats 138*a*-138*f*. The orientation of fingers [tines] 102 in release zone 166 may allow crops to fall away from fingers [tines] 102 onto collection deck 142. In this zone, the finger tips come very close to, but do not stall. That is, the tips of the fingers [tines] 102 are in motion for the full rotation of the reel. In release zone 166, fingers [tines] 102 reach a minimum radial distance from sun axis S due to the action of planetary members 101*a*-101*f*, which may allow greater clearance from header 130. When Z reaches approximately 270-300 degrees, the bats themselves are retracted to be closest to the main reel tube 132. The combined maximum finger and bat retraction results in a "clean reel backside" for minimal interference with the crop collection system 143. In neutral zone 167 (that may extend at an angle Z from about 290 degrees to about 360 degrees), fingers [tines] 102 begin to rotate from an orientation parallel to the direction of motion of bats 138*a*-138*f* to an orientation perpendicular to the direction of motion. In this zone fingers [tines] 102 remain relatively close to sun axis S. Finally, in transition zone 168 (that may extend at an angle Z from about 0 degrees to about 90 degrees), fingers [tines] 102 return to a ready position wherein fingers [tines] 102 are oriented generally perpendicular to the direction of motion of bats 138*a*-138*f*. When fingers [tines] 102 return to crop entry zone 161, the cycle repeats.

In the embodiment as illustrated by FIGS. 1 and 2, a second reel end kit 240 substantially identical to reel end kit 140 may also be provided on header 130 axially aligned along sun axis S and mounted on axle 250 (not shown, but substantially identical to axle 150) and main reel tube 232 (constructed like main reel tube 132) at an opposite end of header 130 to reel end kit 140. Similarly, second reel end kit 240 may have components fixed on reel arm 234. Second reel end kit 240 may be configured and operable to rotate the bats 238*a*-238*f* and fingers [tines] 102 provided thereon, in the same manner reel end kit 140 rotates bats 138*a-f* and the fingers [tines] 102 provided thereon as described above. Second reel end kit 240 may be driven around a common sun axis S by main reel tube 232, in a manner like main reel tube 132 is driven around sun axis S, as referenced above. Thus each transverse half of reel 137 may be constructed as substantially the mirror images of each other.

However, as indicated above, bats 238*a-f* may be angularly offset so that they are equally interleaved with bats 138*a-f*, such that crops are not engaged simultaneously by both sets of bats 138*a-f* and bats 238*a-f*. By engaging crops in an alternating manner, peak loads on header 130 may possibly be reduced when compared with single-reel headers of comparable size. The use of a split main reel tube like main reel tubes 132, 232 may reduce wear when compared to single-reel headers of comparable size. It may also reduce the costs of repair since each part of the split reel as well as reel end kits 140 and 240 may be repaired and/or replaced independently of each other.

While the embodiment shown in FIGS. 1 and 2 provides a split reel on header 130, it will be apparent that header 130 may have a single continuous reel or a plurality of reels such as in the presently described embodiment. In the case of more than 2 reel sections, it is possible to mount the reel end kit 140 to any reel arm configured to support a reel, which may not necessarily be the outermost reel arms on a header. The number of reels may be varied according to engineering requirements without substantially affecting its function.

Figure 7:
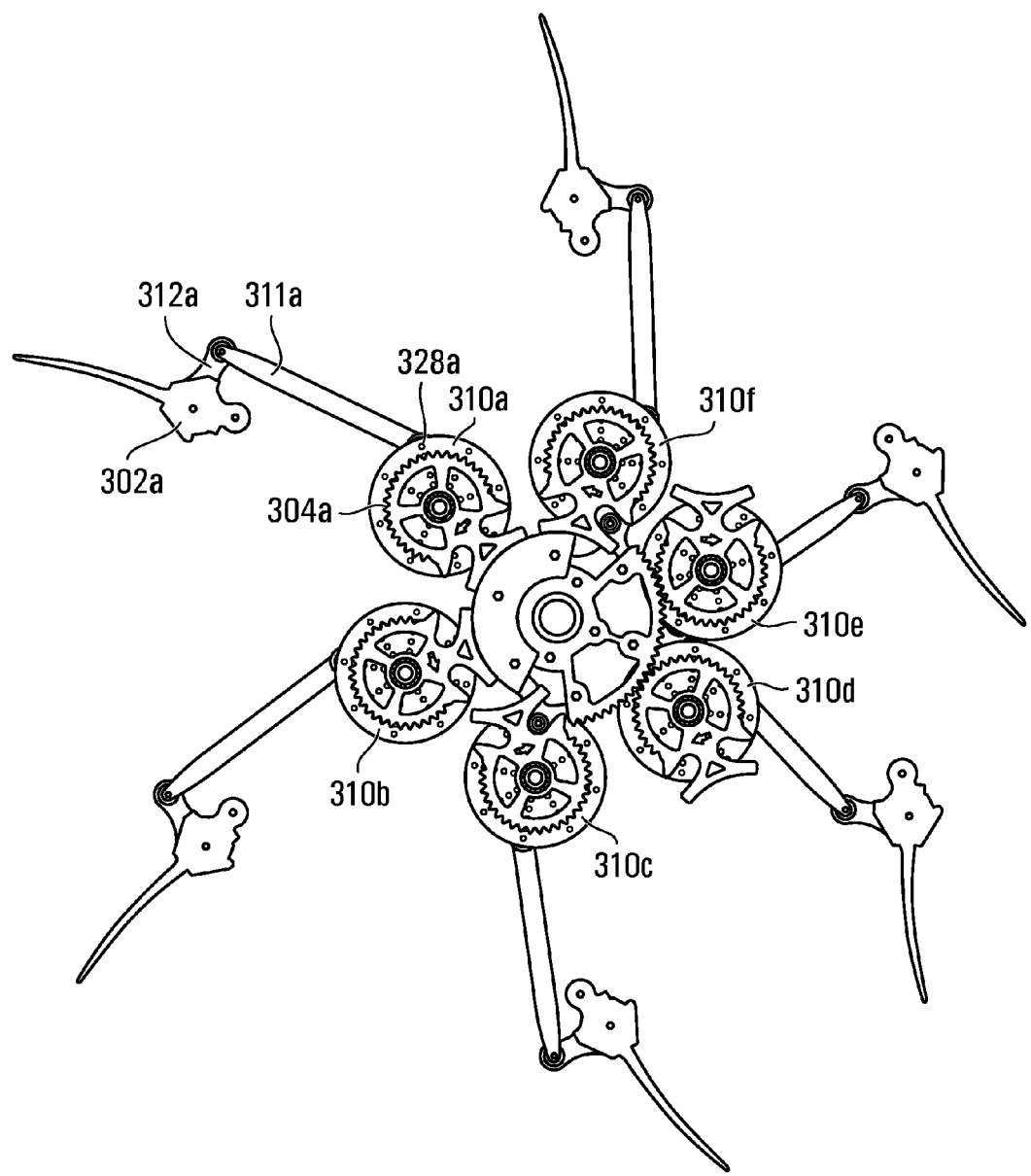
FIG. 7 is a schematic side elevation view of an alternative embodiment of a reel end kit with gear carrier plates omitted for clarity.
Figure 7A:
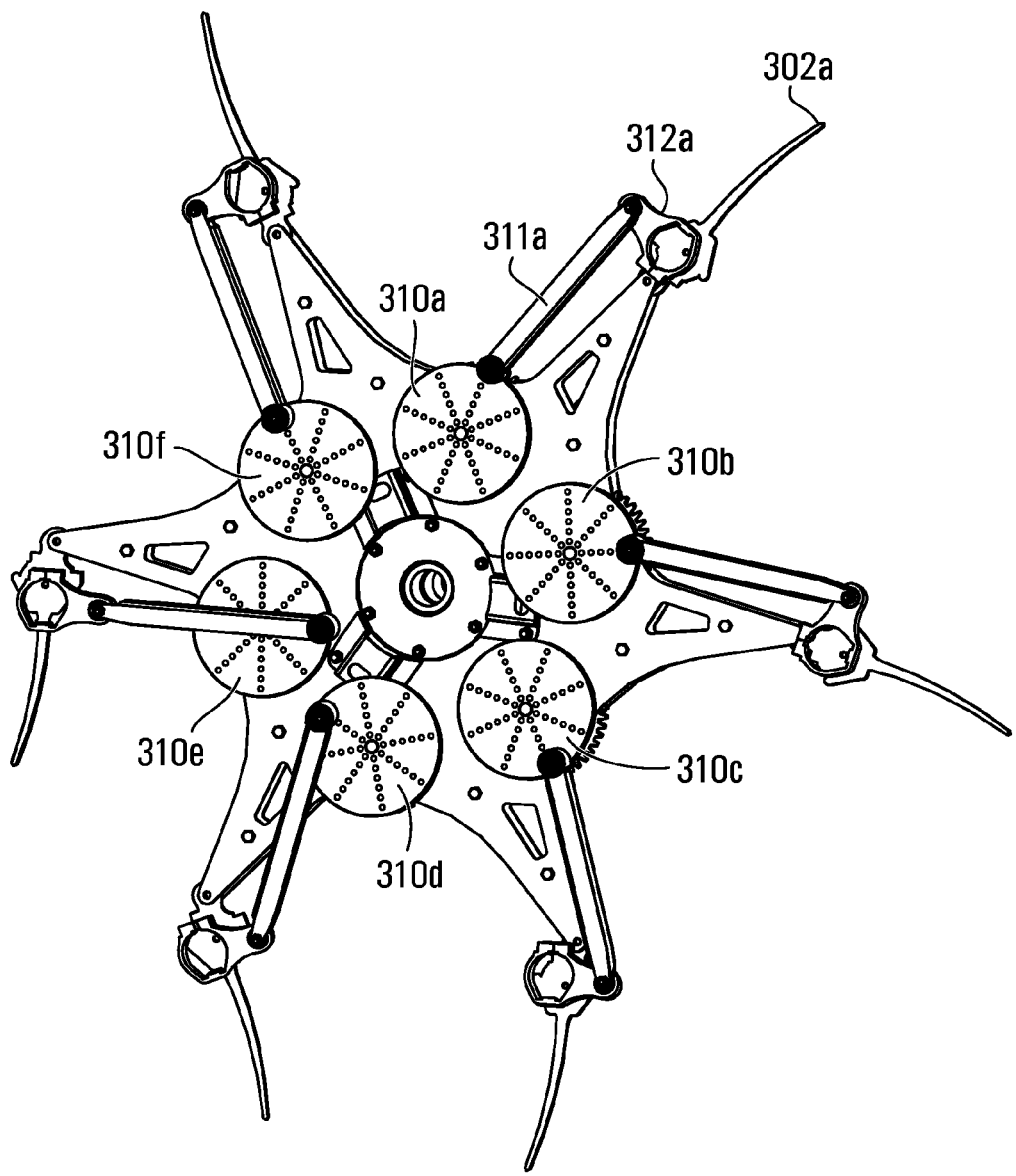
FIG. 7A is a perspective rear view of the alternative embodiment of the reel end kit in FIG. 7 including gear carrier plates.

With reference now to FIGS. 7 and 7A, there is provided an alternate embodiment of a reel end kit generally designated 340. Reel end kit 340 (shown without some components like an axle like axle 150) is substantially identical to reel end kit 140 as described above, except that gear crank arms 110*a*-110*f* are replaced with disk cranks 310*a*-310*f*. Only disk crank 310*a* will be described in detail, but it will be understood that disk cranks 310*a*-310*f* are identical in nature. Disk crank 310*a* may generally circularly disk-shaped, and may be made of one or more durable rigid materials such as steel or aluminum. Disk crank 310*a* can be positioned coaxial to planetary axis 320*a* and planetary gear 304*a* (like planetary gear 104*a*). Disk crank 310*a* may be fixedly attached at its center to planetary gear 304*a* by means of a keyed attachment or using means such as bolts such that disk crank 310*a* rotates simultaneously with planetary gear 304*a*.

Disk crank 310*a* may be provided with a plurality of holes 328*a* distributed both radially and circumferentially around planetary axis 320*a*. Holes 328*a* may be placed on any point on disk crank 310*a*. The pattern as shown in FIGS. 7 and 7A are provided by way of example only. Connecting rod 311*a* may be rotatably attached to any one of holes 328*a* on disk crank 310*a* by means such as a pin or a bolt. In operation, the rotation of planetary gear 304*a* will cause disk crank 310*a* to rotate, thereby causing movement in connecting rod 311*a* and corresponding bat crank arm 312*a* in a manner similar to the embodiment described above. By attaching connecting rod 311*a* to a different hole 328*a* on disk crank 310*a*, one may adjust the timing of the motion of corresponding bat 338*a* (not shown) and fingers [tines] 302*a*.

For example, attachment of connecting rod 311*a* to a hole positioned at a different radial distance from planetary axis 320*a* may alter the range of movement of fingers [tines] 302*a*. Furthermore, the timing of finger movement may be adjusted by selecting a different hole circumferentially along disk crank 310*a* to which connecting rod 311*a* is attached. The use of disk crank 310*a* may therefore allow an operator to calibrate and adjust the timing and motion of bat 338*a* and fingers [tines] 302*a* depending on operational requirements. For example, there may be different optimal finger and bat positions depending on the type of crop being harvested or field conditions.

Figure 14:
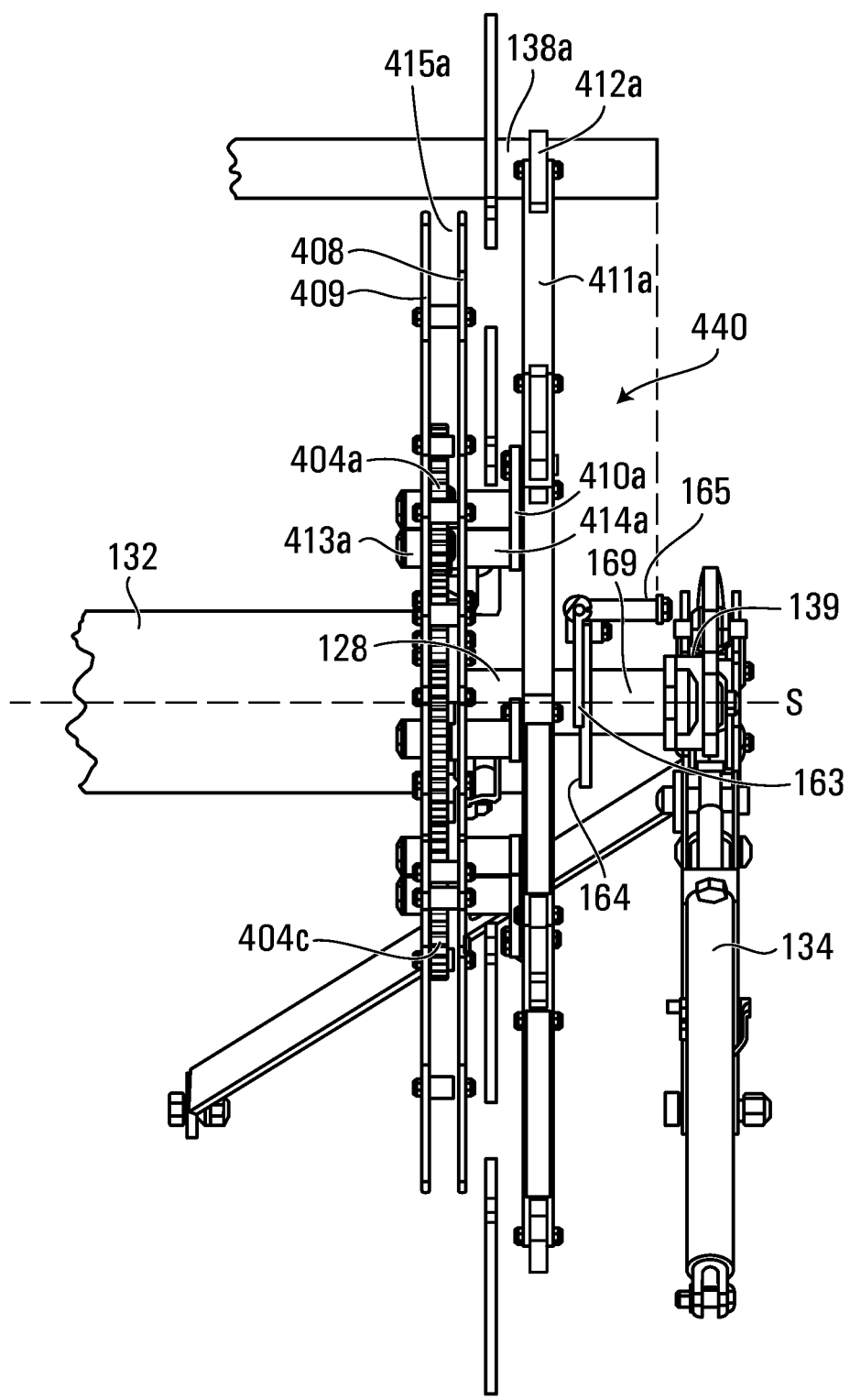
FIG. 14 is a front elevation view of an alternative embodiment of a reel end kit.
Figure 15:
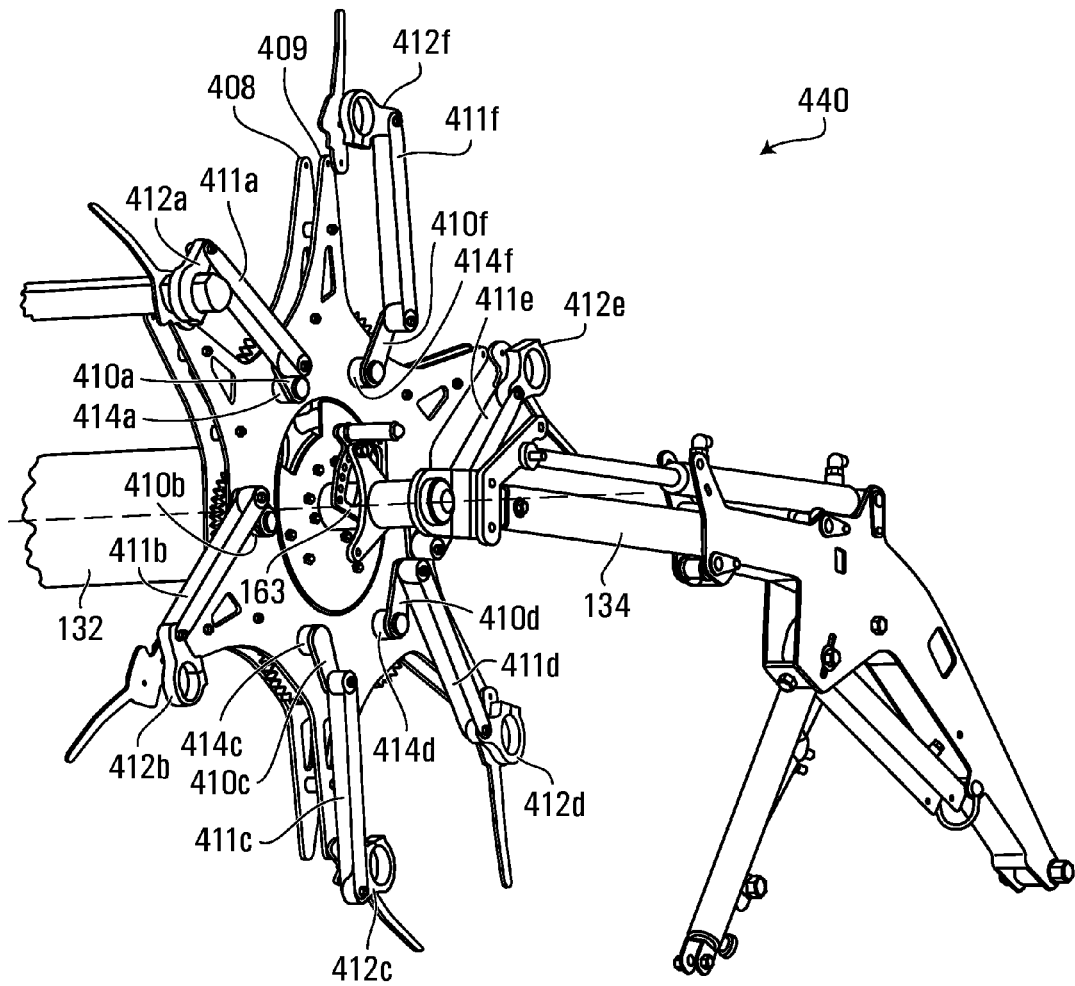
FIG. 15 is a front perspective view of the reel end kit of FIG. 14.
Figure 16:
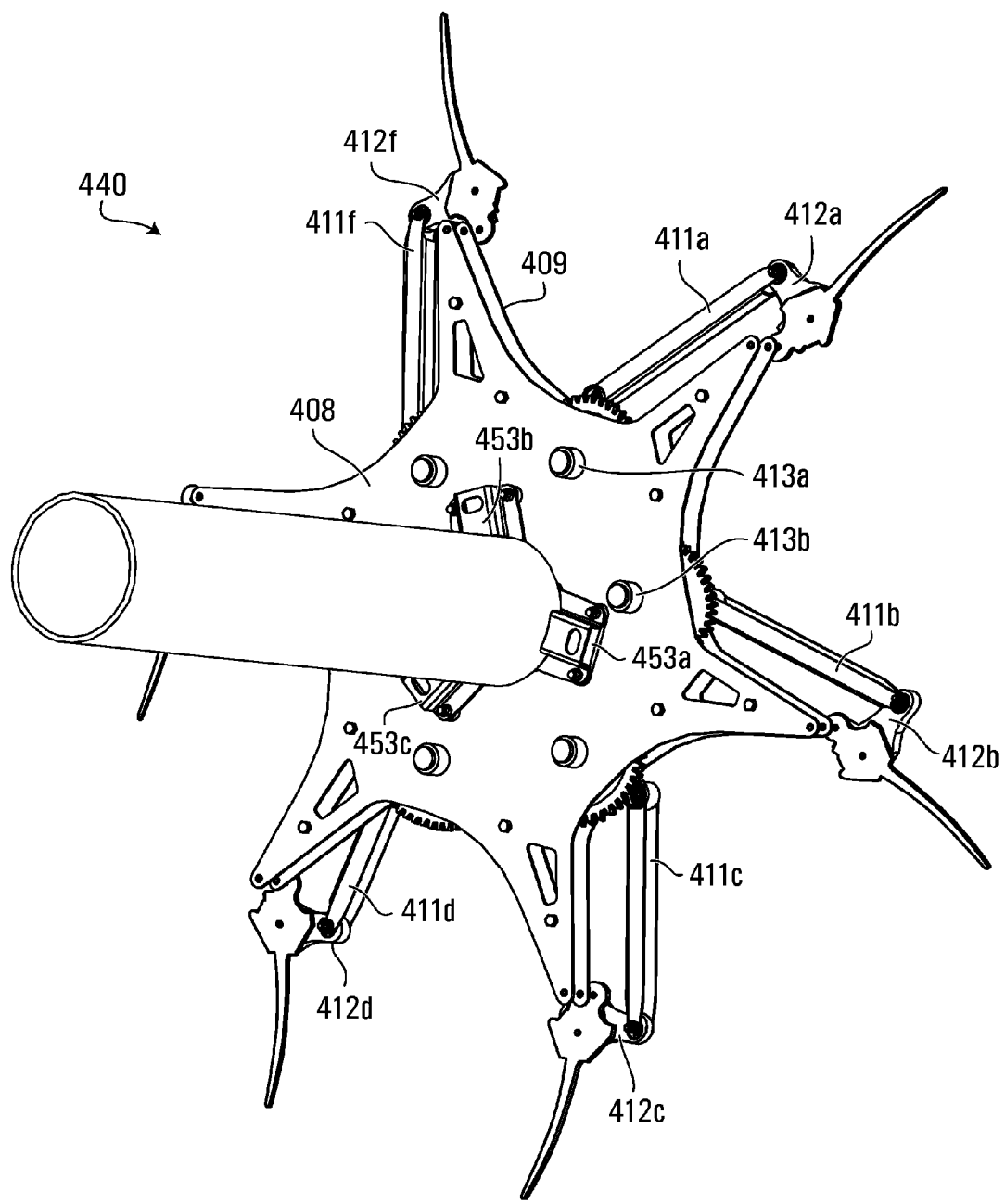
FIG. 16 is a rear perspective view of the reel end kit of FIG. 14.

With reference now to FIGS. 14, 15, and 16, there is provided yet another alternate example embodiment of a reel end kit generally designated 440. Reel end kit 440 is substantially identical to reel end kit 140 as described above, except that gear crank arms 410*a-f*, connecting rods 411*a-f*, and bat crank arms 412*a-f* corresponding to gear crank arms 110*a-f*, connecting rods 111*a-f*, and bat crank arms 112*a-f* respectively, are positioned on the outer side of reel end kit 440 proximate to reel arm 134 instead of the inner side of the reel end kit as shown for example in FIGS. 3, 4, 4A, and 5.

It may be appreciated that in the embodiment as shown in FIGS. 2-5, during rotation of planetary gear systems 101*a-f* about their respective planetary axes 120*a-f*, gear crank arms 110*a-f* must be positioned axially/longitudinally along respective planetary axes 120*a-f* such that there is sufficient distance between (i) the inward facing surface of inner gear carrier plate 108 and (ii) gear crank arms 110*a-f* to provide clearance between gear crank arms 110*a-f* and cleats/brackets 153*a-c* when cranks arms 110*a-f* undergo rotation with their respective planetary gears 104*a-f*. Thus, the keyed connection portion of each gear crank arms 110*a-f*, each of which connects via a shaft and protrusion through cut-outs 113*a-f* of inner gear carrier plate 108 to planetary gears 104*a-f*, must be located at a distance from the inward surface of inner gear carrier plate 108 (as measured axially along planetary axes 120*a-f*) that is greater than the depth of cleats 153*a-c* (as measured perpendicularly from the inward surface of inner gear carrier plate 108). The corresponding circular cut-outs/hollow extensions 113*a-f* on inner gear carrier plate 108 and respective shafts connected to the planetary gears 104*a-f* and cut-outs 113*a-f* must also have a similar minimum length to provide sufficient clearance to allow for the rotation of crank arms 110*a-f*.

By contrast, in the embodiment of FIGS. 14-16, gear crank arms 410*a-f* are positioned proximate the outward facing surface of outer gear carrier plate 409. The planetary gear systems 401*a-f* are located generally axially/longitudinally inward of said inward facing surface of outer gear carrier plate 409 and the crank arms 410*a-f* are located generally longitudinally outward of said outward facing surface of outer gear carrier plate 409. Compared to the embodiment of FIGS. 2-5, it is not necessary for gear crank arms 410*a-f* to be positioned as far away from the surface of outer gear carrier plate 409, since cleats 153*a-c* are only present on the inward facing surface of inner gear carrier plate 408. As a consequence, the length of the shaft extension from protrusions passing through gear carrier plate 409 connected to gear crank arms 410*a-f* and the corresponding circular cut-outs 414*a-f* on outer gear carrier plate 409 may be shorter than the corresponding features relating to gear crank arms 110*a-f* and circular cut-outs 113*a-f* of inner gear carrier plate 108 of the embodiment of FIGS. 3, 4, 4A and 5. One constraint of the embodiment of FIGS. 14-16 is that gear crank arms 410*a-f*, connecting rods 411*a-f*, and bat crank arms 412*a-f* must be positioned to provide clearance for sun gear timing plate 163 when in operation. Thus, at least some of gear crank arms 410*a-f*, connecting rods 411*a-f*, and bat crank arms 412*a-f* must fit within the axial space between outer gear carrier plate 409 and sun gear timing plate 163.

An advantage of the embodiment of the reel kit 440 of FIGS. 14-16 is that the length of the shaft extension from protrusion through inner gear carrier plate 409 connected to gear crank arms 410*a-f* and the corresponding circular cut-outs 414*a-f* on outer gear carrier plate 409 may be made relatively short. Any bushings/bearings that may be utilized to facilitate rotation of the cranks arms 110*a-f* the planetary gears 104*a-f* and respective protrusions and shaft extension connecting with the cranks arms, relative to the outer gear carrier plate 409 and its cut-outs 414*a-d*, may be facilitated by less durable, heavy and expensive bearing/bushing components, such as bearing/bushing elements made from a suitable plastic material such as polymer. By way of example suitable components that may be employed are polymer plain bushings available from Igus (see for example at website http://www.igus.eu/wpck/2400/productoverview_iglidur#Section 7. This shorter length/distance may decrease the amount of material used in construction and the corresponding weight of the end kit 440. It may also decrease wear on parts, as the shorter keyed portion (shaft extensions) of gear crank arms 410*a-f* located within circular cut-outs 414*a-f* may reduce the moment of force applied through the gear crank arms 410*a-f* to the connecting rods, bat crank arms, and bats. Thus, it may also, at least for some components such as the hollow extensions 413 on gear carrier support plates 408, 409 and any bearings/bushings, be possible to use lighter and cheaper materials in the construction of this embodiment, such as relatively thin sheet metals for gear carrier plates 408, 409 such as by way of example only 10 gauge sheet steel, to the increased durability of the design.

Moreover, the embodiment of FIGS. 14-16 may improve ease of assembly, installation, and repair. Placement of gear crank arms 410*a-f*, connecting rods 411*a-f*, and bat crank arms 412*a-f* on the outer surface of reel end kit 440 provides easier access to these components, for example, if they must be replaced or repaired. During installation, as compared to the embodiment described above, gear crank arms 410*a-f*, connecting rods 411*a-f*, and bat crank arms 412*a-f* may be installed after reel end kit 440 is mounted on main reel tube 132, which may improve ease of installation.

Figure 17:
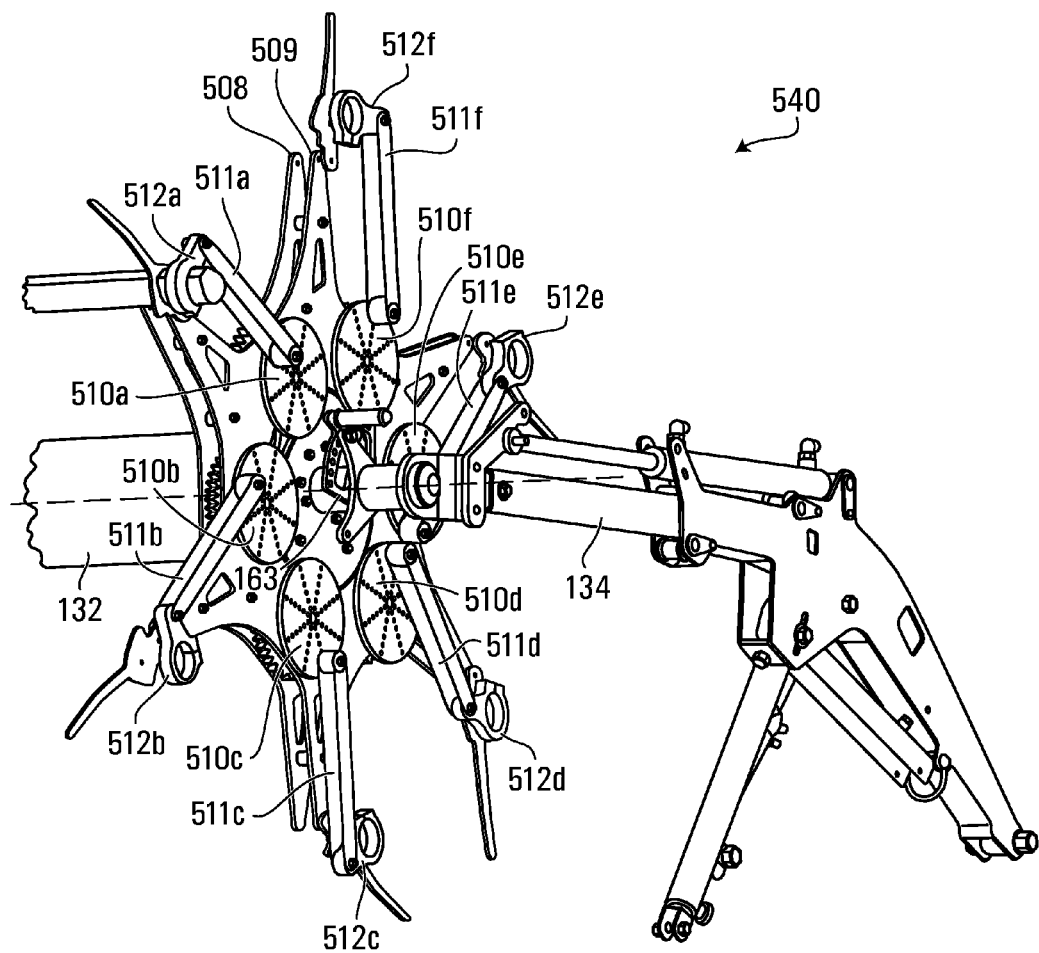
FIG. 17 is a front perspective view of an alternative embodiment of a reel end kit.

It may be appreciated that the use of the planetary gear end kit like end kit 140 in a reel for a harvesting header may require a significantly less number of parts compared to alternate systems, and may be much more readily repaired/replaced due to ease of removal and installation compared to at least some alternate systems. Similar to the reel end kit 440, the embodiment reel end kit generally designated 340 illustrated in FIGS. 7 and 7A may also be modified and have components positioned outward of the outward facing surface of the outer gear carrier plate. This exemplary embodiment is illustrated in FIG. 17. Thus reel end kit 540 may be provided with disk cranks 510a-510f positioned outward of outward facing surface of the outer gear carrier plate 509. Gear crank arms 510a-f, connecting rods 511a-f, and bat crank arms 512a-f must be positioned to provide clearance for sun gear timing plate 163 when in operation. Thus, at least some of gear crank arms 510a-f, connecting rods 511a-f, and bat crank arms 512a-f must fit within the axial space between outer gear carrier plate 509 and sun gear timing plate 163 (such as in FIGS. 14-16).

The above described embodiments are intended to be illustrative only and in no way limiting. The described embodiments of carrying out the invention are susceptible to many modifications of form, arrangement of parts, details and order of operation. Other modifications will be apparent to those skilled in the art and, therefore, the invention is defined in the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A crop harvesting header comprising:
   a reel rotatable about a reel axis, said reel having at least one reel bat supported at a spaced distance from the reel axis, the at least one reel bat being operable for pivotal movement about a bat axis radially spaced from said reel axis and oriented generally parallel to the reel axis;
   the at least one reel bat having at least one crop collection member connected thereto, said at least one crop collection member extending generally away from said bat axis, the at least one reel bat being operable to move in a cyclical path around the reel axis during rotation of the reel;
   the at least one reel bat being operable to be pivoted about its bat axis so as to vary the angular orientation of the at least one crop collection member about the bat axis as the reel rotates about the reel axis;
   a sun gear;
   a planetary gear assembly being rotatable about and relative to said sun gear and rotatable about said reel axis;
   said planetary gear assembly being operable during rotation about the reel axis with the reel to interact with the sun gear, and cause said planetary gear assembly to effect pivotal movement of said at least one reel bat about its bat axis;
   said planetary gear assembly comprising at least one planetary gear system operable to be rotated around said reel axis and said sun gear, and said at least one planetary gear system comprising a planetary gear being rotatable about a planetary gear axis; said at least one planetary gear system being interconnected to said at least one reel bat, said planetary gear system being operable during rotation about the reel axis with the reel, to rotate with the reel and for said planetary gear to engage with the sun gear, such that said planetary gear system causes pivotal movement of said at least one reel bat about said bat axis;
   said at least one planetary gear system further comprising a bat connection mechanism connecting said planetary gear with a reel bat, such that during rotation of said planetary gear system about the reel axis the planetary gear interacts with the sun gear, and through said interaction each said bat connection mechanism cause pivotal movement of said reel bat about its bat axis;
   said bat connection mechanism comprises:
   (a) a gear crank device connected to said planetary gear and operable for rotation with said planetary gear;
   (b) a connecting member having one end connected to said gear crank device and another end connected to a first end of a bat crank arm; said bat crank arm being interconnected to a bat;
      wherein in operation, rotation of said planetary gear causes said gear crank device to rotate about said planetary gear axis with said planetary gear, which causes said gear crank device to move said connecting member, which causes said bat crank arm to rotate said bat about said bat axis.

2. A crop harvesting header as claimed in claim 1 wherein said sun gear has a central sun axis positioned in substantial axial alignment with the reel axis.

3. A crop harvesting header as claimed in claim 1, further comprising:
   (i) a frame operable to be moved in a direction of movement across ground carrying a crop to be harvested;
   (ii) a cutting system operable for cutting crop material situated on the ground;
   (iii) a crop collection system operable for receiving crop material cut by the cutting system and transporting the cut crop material for further handling;
      wherein said reel is supported by, and rotatably mounted on, said frame and said reel operable to move crop in an area of the cutting system and operable to assist in feeding cut crop material to the crop collection system;
      wherein said reel axis is oriented generally longitudinally and the reel is mounted on the frame for movement therewith in the direction of movement and mounted for rotation about said reel axis;
      wherein the reel comprises a plurality of reel bats supported at spaced positions around the reel axis, each of the reel bats being mounted for pivotal movement about a bat axis located radially outward from said reel axis and oriented generally parallel to the reel axis;
      each of said plurality of reel bats having a plurality of crop collection members, said crop collections members extending generally away from the respective reel bat;
      each of the reel bats being operable to move in a cyclical path around the reel axis during rotation of the reel;
      each of the reel bats being operable to be pivoted about its respective bat axis so as to vary the angle of the crop collection members about the bat axis as the reel rotates;
      said sun gear being located proximate one end of the reel and being fixed relative to the frame;

wherein said planetary gear assembly comprises a plurality of planetary gear systems each operable to be rotated around said reel axis and sun gear, and said planetary gear systems each having a planetary gear being rotatable about a respective planetary gear axis; said plurality of planetary gear systems being each interconnected to a respective one of said plurality of reel bats, each of the planetary gear systems being operable during rotation about the reel axis with the reel, to rotate with the reel and have its respective planetary gear rotate about its planetary gear axis and engage with the sun gear, such that each of said planetary gear systems causes pivotal movement in each respective reel bat and its crop collection members about its respective bat axis.

4. A header as claimed in claim 3, said header further comprising a reel drive mechanism operable to drive said planetary gear assembly in rotation about said reel axis, and wherein said planetary gear assembly comprises at least one gear carrier plate connected to said plurality of planetary gear systems, and wherein said reel drive mechanism drives said at least one carrier plate and said planetary systems in rotation about said reel axis.

5. A header as claimed in claim 4 wherein said reel further comprises a main reel tube, and wherein said main reel tube is interconnected to said at least one gear carrier plate and wherein said reel drive mechanism is interconnected to said main reel tube to drive said main reel tube in rotation about said reel axis so as to drive said at least one carrier plate and said plurality of planetary gear systems about said reel axis.

6. A header as claimed in claim 4, wherein said at least one gear carrier plate comprises first and second gear carrier plates connected to each other and to said plurality of planetary gear systems and wherein said plurality of first and second gear carrier plates support said plurality of planetary gear systems there between.

7. A header as claimed in claim 3 wherein each of said planetary gear systems comprises a planetary gear mounted for rotation about a planetary axis, and each said planetary gear system further comprising a bat connection mechanism connecting each said planetary gear with a respective one of said plurality of reel bats, such that during rotation of said planetary gear systems about the reel axis the planetary gears interact with the sun gear, and through said interaction each said bat connection mechanism cause pivotal movement of each respective reel bat about its respective bat axis.

8. A header as claimed in claim 7 wherein said planetary gear assembly comprises at least one gear carrier plate connected to said plurality of planetary gear systems, and wherein said at least one gear carrier plate has an outward facing surface and an inward facing surface and wherein said planetary gear systems are located generally longitudinally inward of said inward facing surface of said at least one gear plate and said gear crank arm is located generally longitudinally outward of said outward facing surface of said at least one gear carrier plate.

9. A header as claimed in claim 7 wherein each of said plurality of planetary gears and said sun gear are configured so that in operation there will be pivotal movement of each respective reel bat about its respective bat axis during only a rotational part of the cycle of rotation of said reel about said reel axis.

10. A header as claimed in claim 9 wherein each said planetary gear and said sun gear have toothed sections which when engaged in operation cause pivotal movement of each respective reel bat about its respective bat axis.

11. A header as claimed in claim 10 wherein each said planetary gear and said sun gear have non-toothed sections which when engaged in operation cause the reel bat to have no pivotal movement of each respective reel bat about its respective bat axis.

12. A header as claimed in claim 11 wherein when each of said non-toothed sections of said planetary gear and said sun gear are engaged, said planetary gear is in a locked configuration whereby the sun gear and the planetary gear interact to prevent rotation of each planetary gear about its respective planetary gear axis and thus lock the reel bat to prevent pivotal movement of each respective reel bat about its respective bat axis.

13. A header as claimed in claim 12 further comprising a pin member on said sun gear and a slot mounted on each of said planetary gears, said pin member and each said slot configured to co-operate such that during operation during rotation of each planetary gear about said sun axis, said slot will engage with said pin member to transition said planetary gear from a first state of non-rotation about its planetary gear axis to a second state of rotation about said planetary gear axis.

14. A header as claimed in claim 13 wherein said pin member comprises a first pin member and said slot comprises a first slot, and wherein said header further comprises a second pin member on said sun gear and a second slot mounted on each of said planetary gears, said second pin member and each said second slot configured to co-operate such that during operation during rotation of each planetary gear about said sun axis, said second slot will engage with said second pin member to transition said planetary gear from said second state of non-rotation about its planetary gear axis to said first state of rotation about said planetary gear axis.

15. A crop harvesting header as claimed in claim 3 wherein each bat axis of said plurality of said bat axes is located at a distance from a central longitudinal axis through said respective reel bat.

16. A header as claimed in claim 1, further comprising a reel drive mechanism operable to drive said planetary gear assembly in rotation about said reel axis.

17. A crop harvesting header as claimed in claim 1 wherein said gear crank device comprises a gear crank arm.

18. A header as claimed in claim 1, wherein said bat axis is located at a distance from a central longitudinal axis through said at least one reel bat.

19. A kit for use with a harvesting header, said kit being configured to be interconnected to a reel of said harvesting header, said kit comprising:
(a) a sun gear assembly comprising a sun gear;
(b) a planetary gear apparatus comprising (i) a plurality of planetary gear systems, each of said planetary gear systems positioned and operable to be rotated about and engage with said sun gear; (ii) at least one gear carrier plate operable to support said plurality of planetary gear systems; said planetary gear apparatus being operable to be rotated about said sun gear;
(c) a connection mechanism for connecting said sun gear assembly to said planetary gear apparatus;
(d) a plurality of bat connection mechanisms operable for connecting a planetary gear of each said plurality of planetary gear systems with a reel bat, such that in operation, during rotation of said planetary gear system about the reel axis each planetary gear interacts with the sun gear, and through said interaction each said bat connection mechanism cause pivotal movement of a connected reel bat about its bat axis;

where each of said plurality of bat connection mechanisms comprises:
   (i) a gear crank device, each said gear crank device connected to a planetary gear and operable for rotation with said planetary gear about a planetary gear axis;
   (ii) a connecting rod, each connecting rod having one end connected to said gear crank device and another end of said connecting rod configured to be connected to a first end of a bat crank arm, each said bat crank arm being operable for connection to a reel bat;
wherein when said end kit is interconnected to a reel, in operation said reel is rotated about a reel axis, and each of the plurality of planetary gear systems is operable to cause pivotal movement of each of a plurality of interconnected reel bats to pivot about its respective bat axis;
and wherein when said kit is interconnected to said bat crank arm, in operation, rotation of said plurality of planetary gears about said sun gear causes said plurality of gear crank devices to rotate about said planetary gear axes with said respective plurality of planetary gears, which causes said plurality of gear crank devices to move said respective connecting rods, which causes each of said respective bat crank arms to rotate said respective reel bats about their respective bat axes during at least part of the rotation of the planetary gears about said sun gear.

20. A kit as claimed in claim 19 further comprising an axle received through said sun gear and said plurality of planetary gear systems.

21. A kit as claimed in claim 19 comprising first and second gear carrier plates for supporting said plurality of planetary gear systems there between.

22. A kit as claimed in claim 19 wherein each of said plurality of planetary gear systems further comprises a plurality of planetary gears rotatable about respective planetary gear axes, and a plurality of bat connection mechanisms operable for connecting each of said plurality of planetary gears with a respective one of a plurality of reel bats of said reel, said end kit operable such that when connected to said reel, during rotation of said reel about a reel axis, each of the planetary gears is operable to interact with the sun gear, and through each said bat connection mechanism cause pivotal movement of each respective reel bat about its respective bat axis.

23. A crop harvesting header comprising:
   a reel rotatable about a reel axis, said reel having at least one reel bat supported at a spaced distance from the reel axis, the at least one reel bat being operable for pivotal movement about a bat axis radially spaced from said reel axis and oriented generally parallel to the reel axis;
   the at least one reel bat having at least one crop collection member connected thereto, said at least one crop collection member extending generally away from said bat axis,
   the at least one reel bat having an outward end;
   the at least one reel bat being operable to move in a cyclical path around the reel axis during rotation of the reel;
   the at least one reel bat being operable to be pivoted about its bat axis so as to vary the angle of the at least one crop collection member about the bat axis as the reel rotates about the reel axis;
   a sun gear;
   a kit comprising (i) a gear system and (ii) a bat connection mechanism connecting said gear system to said at least one reel bat;
   wherein said gear system is operable during rotation to effect pivotal movement of said at least one reel bat about its bat axis; and wherein:
      said gear system comprises a planetary gear assembly being rotatable about and relative to said sun gear and rotatable about said reel axis;
      said planetary gear assembly being operable during rotation about the reel axis with the reel to interact with the sun gear, and cause said planetary gear assembly to effect pivotal movement of said at least one reel bat about its bat axis;
      said planetary gear assembly comprising at least one planetary gear system operable to be rotated around said reel axis and said sun gear, and said at least one planetary gear system comprising a planetary gear being rotatable about a planetary gear axis; said at least one planetary gear system being interconnected to said at least one reel bat, said planetary gear system being operable during rotation about the reel axis with the reel, to rotate with the reel and for said planetary gear to engage with the sun gear, such that said planetary gear system causes pivotal movement of said at least one reel bat about said bat axis;
      said at least one planetary gear system further comprising a bat connection mechanism connecting said planetary gear with a reel bat, such that during rotation of said planetary gear system about the reel axis the planetary gear interacts with the sun gear, and through said interaction each said bat connection mechanism cause pivotal movement of said reel bat about its bat axis;
      said bat connection mechanism comprising:
         (a) a gear crank device connected to said planetary gear and operable for rotation with said planetary gear;
         (b) a connecting rod having one end connected to said gear crank device and another end connected to a first end of a bat crank arm; said bat crank arm being interconnected to a bat;
         wherein in operation, rotation of said planetary gear causes said gear crank device to rotate about said planetary gear axis with said planetary gear, which causes said gear crank device to move said connecting rod, which causes said bat crank arm to rotate said bat about said bat axis.

24. A crop harvesting header as claimed claim 23 wherein said kit further comprises first and second gear carrier plates for supporting said gear system and said bat connection mechanism, and wherein at least part of said gear system is sandwiched between said first and second gear carrier plates.

25. A crop harvesting header comprising:
   a reel rotatable about a reel axis, said reel having at least one reel bat supported at a spaced distance from the reel axis, the at least one reel bat being operable for pivotal movement about a bat axis radially spaced from said reel axis and oriented generally parallel to the reel axis;
   the at least one reel bat having at least one crop collection member connected thereto, said at least one crop collection member extending generally away from said bat axis, the at least one reel bat being operable to move in a cyclical path around the reel axis during rotation of the reel;
   the at least one reel bat being operable to be pivoted about its bat axis so as to vary the angular orientation of the at least one crop collection member about the bat axis as the reel rotates about the reel axis;

a sun gear;

a planetary gear assembly being rotatable about and relative to said sun gear and rotatable about said reel axis;

said planetary gear assembly being operable during rotation about the reel axis with the reel to interact with the sun gear, and cause said planetary gear assembly to effect pivotal movement of said at least one reel bat about its bat axis;

said planetary gear assembly comprising at least one planetary gear system operable to be rotated around said reel axis and said sun gear, and said at least one planetary gear system comprising a planetary gear being rotatable about a planetary gear axis;

said at least one planetary gear system being interconnected to said at least one reel bat, said planetary gear system being operable during rotation about the reel axis with the reel, to rotate with the reel and for said planetary gear to engage with the sun gear, such that said planetary gear system causes pivotal movement of said at least one reel bat about said bat axis;

said at least one planetary gear system further comprising a bat connection mechanism connecting said planetary gear with a reel bat, such that during rotation of said planetary gear system about the reel axis the planetary gear interacts with the sun gear, and through said interaction each said bat connection mechanism cause pivotal movement of said reel bat about its bat axis;

said planetary gear and said sun gear being configured so that in operation, during rotation of said planetary gear about said sun gear the interaction of the planetary gear and the sun gear is such there will only be rotational movement of said planetary gear about said planetary gear axis resulting in pivotal movement of said reel bat about said bat axis, during a part the cycle of rotation of said reel about said reel axis.

26. A header as claimed in claim 25 wherein each said planetary gear and said sun gear have toothed sections which when engaged in operation cause pivotal movement of each respective reel bat about its respective bat axis; and wherein each said planetary gear and said sun gear have non-toothed sections which when engaged in operation cause the reel bat to have no pivotal movement of each respective reel bat about its respective bat axis.

* * * * *

UNITED STATES PATENT AND TRADEMARK OFFICE
CERTIFICATE OF CORRECTION

PATENT NO. : 9,526,209 B2  
APPLICATION NO. : 14/814860  
DATED : December 27, 2016  
INVENTOR(S) : Glenn Honey Page 1 of 1

It is certified that error appears in the above-identified patent and that said Letters Patent is hereby corrected as shown below:

In the Specification

Column 24, Line 45, "#Section 7." should be changed to --#Section_7.--

In the Claims

Column 27, Line 35, the portion of Claim 6 reading, "wherein said plurality of first and" should read --wherein said first and--

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*